(12) United States Patent
Yamagaki et al.

(10) Patent No.: US 10,172,148 B2
(45) Date of Patent: Jan. 1, 2019

(54) COMMUNICATION TERMINAL, COMMUNICATION METHOD, STORAGE MEDIUM ON WHICH COMMUNICATION PROGRAM IS STORED, AND COMMUNICATION SYSTEM

(71) Applicant: NEC Corporation, Minato-ku, Tokyo (JP)

(72) Inventors: Norio Yamagaki, Tokyo (JP); Shunichi Kinoshita, Tokyo (JP); Hirofumi Ueda, Tokyo (JP); Norihito Fujita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 66 days.

(21) Appl. No.: 15/321,877

(22) PCT Filed: Jun. 22, 2015

(86) PCT No.: PCT/JP2015/003110
§ 371 (c)(1),
(2) Date: Dec. 23, 2016

(87) PCT Pub. No.: WO2016/002161
PCT Pub. Date: Jan. 7, 2016

(65) Prior Publication Data
US 2017/0142747 A1 May 18, 2017

(30) Foreign Application Priority Data
Jul. 1, 2014 (JP) .................................. 2014-135816

(51) Int. Cl.
*H04W 72/12* (2009.01)
*H04W 72/02* (2009.01)
(Continued)

(52) U.S. Cl.
CPC ..... *H04W 72/1242* (2013.01); *H04L 12/4625* (2013.01); *H04W 72/02* (2013.01);
(Continued)

(58) Field of Classification Search
CPC . H04W 72/1242; H04W 74/02; H04W 72/02; H04W 74/0816; H04W 72/121; H04L 12/4625
(Continued)

(56) References Cited

U.S. PATENT DOCUMENTS 7,792,043 B2 * 9/2010 McNutt ................ G05B 19/054
370/242
2003/0063588 A1 * 4/2003 Lee ..................... H04J 13/0048
370/335
(Continued)

FOREIGN PATENT DOCUMENTS

| JP | 2005-253012 A | 9/2005 |
| JP | 2007-184937 A | 7/2007 |

(Continued)

OTHER PUBLICATIONS

A. Vandat, D. Becker, "Epidemic Routing for Partially-Connected Ad Hoc Networks", Tech. Report CS-200006, Department of Computer Science, Duke University, Durham, NC, USA, Apr. 2000.
(Continued)

*Primary Examiner* — Faisal Choudhury

(57) ABSTRACT

A data-storing-terminal counting unit counts the number of communication terminals in which each of a number of data are stored. Based on the results of the counts, a communication terminal count estimation unit estimates the number of communication terminals that will transmit data with the same timing. An adjustment reference value calculation unit computes an adjustment reference value for constraining the number of communication terminals estimated by the com-
(Continued)

munication terminal count estimation unit to be less than or equal to a preset allowable number. On the basis of the adjustment reference value computed by the adjustment reference value calculation unit, a determination unit determines whether or not to permit transmission of data stored by a storing means. If the determination unit permits the transmission of said data, a data transmission unit transmits the data to a communication terminal in which said data is not stored.

1 Claim, 18 Drawing Sheets

(51) Int. Cl.
*H04W 74/08* (2009.01)
*H04W 74/02* (2009.01)
*H04W 84/12* (2009.01)
*H04L 12/46* (2006.01)
*H04J 3/00* (2006.01)

(52) U.S. Cl.
CPC ....... *H04W 74/02* (2013.01); *H04W 74/0816* (2013.01); *H04W 84/12* (2013.01); *H04W 72/121* (2013.01)

(58) Field of Classification Search
USPC .......................................... 370/336
See application file for complete search history.

(56) References Cited

U.S. PATENT DOCUMENTS

| 2005/0195827 | A1  | 9/2005  | Yao et al. |
| 2010/0172261 | A1* | 7/2010  | Shinbo .............. H04L 41/142 370/252 |
| 2011/0058490 | A1* | 3/2011  | Mills ................. H04L 12/1886 370/252 |
| 2012/0008590 | A1* | 1/2012  | Novak ................ H04J 3/0682 370/330 |
| 2013/0279395 | A1* | 10/2013 | Aramoto .............. H04W 76/32 370/312 |
| 2015/0146631 | A1* | 5/2015  | Kim ................. H04W 74/0833 370/329 |

FOREIGN PATENT DOCUMENTS

| JP | 2010-050505 A    | 3/2010 |
| JP | 2011-142456 A    | 7/2011 |
| WO | 2013/046798 A1   | 4/2013 |

OTHER PUBLICATIONS

International Search Report for PCT Application No. PCT/JP2015/003110, dated Sep. 8, 2016.
English translation of Written opinion for PCT Application No. PCT/JP2015/003110.

* cited by examiner

Fig. 12

| CONTENT IDENTIFIER | POSSESSION FLAG | POSSESSING-COMMUNICATION-TERMINAL COUNT INFORMATION | ESTIMATED-COMMUNICATION-TERMINAL COUNT INFORMATION |
| --- | --- | --- | --- |

Fig. 16

| CONTENT IDENTIFIER | POSSESSION FLAG | POSSESSING-COMMUNICATION-TERMINAL COUNT INFORMATION | ESTIMATED-COMMUNICATION-TERMINAL COUNT INFORMATION | TRANSMISSION COMPLETION TIME INFORMATION | ered trademark] or wireless fidelity) function, such as a
COMMUNICATION TERMINAL, COMMUNICATION METHOD, STORAGE MEDIUM ON WHICH COMMUNICATION PROGRAM IS STORED, AND COMMUNICATION SYSTEM This application is a National Stage Entry of PCT/JP2015/003110 filed on Jun. 22, 2015, which claims priority from Japanese Patent Application 2014-135816 filed on Jul. 1, 2014, the contents of all of which are incorporated herein by reference, in their entirety.

TECHNICAL FIELD

The present invention relates to a communication terminal, a communication method, a storage medium on which a communication program is stored, and a communication system, and particularly to a communication terminal, a communication method, a storage medium on which a communication program is stored, and a communication system, respectively using a communication network.

BACKGROUND ART

Rapid spread of a communication terminal with a wireless local area network (LAN) (also referred to as Wi-Fi [registered trademark] or wireless fidelity) function, such as a smart phone and a tablet-type communication terminal, has recently led to widespread use of a wireless LAN. There are wireless LAN related standards including widely prevalent IEEE 802.11a, b, g, and n, specifications of which being developed by the Institute of Electrical and Electronics Engineers, Inc. (IEEE).

In wireless LAN standards such as IEEE 802.11a, b, g, and n, an operation for detecting frame collision is not defined. Accordingly, a wireless LAN communication terminal uses an access control method called a carrier sense multiple access with collision avoidance (CSMA/CA) method in a media access control (MAC) layer. A communication terminal connected to a wireless LAN receives a signal in a transmission medium (wireless frequency) to be used and checks (carrier sense) whether or not another communication terminal currently in communication exists before starting data transmission.

When determining that another communication terminal currently in communication using a wireless frequency band to be used does not exist and communication is feasible, each communication terminal connected to the wireless LAN avoids collision (collision avoidance) of transmitted frames (data) by starting communication (multiple access) after a waiting time corresponding to a generated random number elapses.

In this case, when random numbers generated by the respective communication terminals have mutually close values, data transmission timings become close to one another and data collision occurs. While each communication terminal checks receipt of data by receiving a positive acknowledgement (ACK), an ACK is not transmitted when such collision occurs. Consequently, each communication terminal, not receiving an ACK when a predetermined time elapses after transmitting data, generates a random number again and retransmits the data after a waiting time corresponding to the random number elapses.

PTL 1 describes a method of avoiding collision in wireless communication by receiving a state notification signal indicating an operating state and an operation timing of a neighboring communication terminal, and controlling a time slot width, a communication timing, and the like of the own communication terminal in accordance with communication status of the neighboring communication terminal.

Further, PTL 2 describes a method of decreasing a packet collision probability by randomly delaying data transmission.

NPL 1 discloses a method of, when communication terminals move and approach one another, exchanging information indicating stored contents and synchronizing the stored contents, in accordance with an epidemic method. FIG. 21 is an explanatory diagram illustrating an example of a communication system synchronizing stored contents by an epidemic method. As illustrated in FIG. 21, communication terminals 1 and 2 cyclically transmit and receive a control message including a summary vector being a list of content stored locally to and from adjacent separate communication terminals 2 and 1, and exchange the summary vectors. Then, each of the communication terminals 1 and 2 detects difference between content stored in the other communication terminal 2 or 1 being a source of a control message, and content stored in the own terminal 1 or 2, in accordance with a summary vector received from the other communication terminal 2 or 1. In the example illustrated in FIG. 21, the communication terminal 1 stores content A, content B, and content C, and the communication terminal 2 stores the content A and the content B. Accordingly, difference between the content stored in the communication terminal 1 and the content stored in the communication terminal 2 is the content C. In order to eliminate the difference, the communication terminal 2 requests transmission of the content C to the communication terminal 1 being the source of the control message. In response to the request, the communication terminal 1 transmits the content C to the communication terminal 2. By the aforementioned processing, content difference is transmitted and received between the communication terminal 1 and the communication system 2 in the communication system illustrated in FIG. 21. Then, content stored in each of the communication terminals 1 and 2 becomes identical to each other, and the stored contents are synchronized.

CITATION LIST

Patent Literature

[PTL 1] Japanese Unexamined Patent Application Publication No. 2005-253012
[PTL 2] Japanese Unexamined Patent Application Publication No. 2007-184937

Non Patent Literature

[NPL 1] A. Vandat, D. Becker, "Epidemic Routing for Partially-Connected Ad Hoc Networks," Tech. Report CS-200006, Duke University, April 2000

SUMMARY OF INVENTION

Technical Problem

When a number of communication terminals using a same wireless frequency band in a wireless LAN for synchronizing stored contents with one another is small, data collision rarely occurs; however, as the number of communication terminals increases, a probability of occurrence of data collision rises, and a data collision count increases. Consequently, a problem arises that throughput in communication between the respective communication terminals degrades, causing difficulty in use of the wireless LAN.

In order to solve the problem, for example, a method described below may be considered. That is to say, all communication terminals (also referred to as nodes) connected to a wireless LAN are clustered in a plurality of nodes. Further, each node is controlled so as to operate on the basis of a time slot (a communication time period being a data transmission channel demarcated in a certain time interval) unified throughout all the nodes. Then, an opportunity (time slot) of transmitting data is allocated to each node on a cluster-by-cluster basis.

In order to allocate an opportunity (time slot) of transmitting data to each node on a cluster-by-cluster basis, a starting time of a time slot and the like need to be synchronized at all nodes. However, there is a problem that it is very difficult to synchronize a time of each node. In other words, it is not easy to solve the problem that, as a number of communication terminals increases, a probability of occurrence of data collision rises, and a data collision count increases.

Given the situation, an object of the present invention is to provide a communication terminal, a communication method, a storage medium on which a communication program is stored, and a communication system, respectively capable of satisfactorily suppressing increase in data collision count even when a number of communication terminals connected to a communication network increases.

Solution to Problem

A communication, according to the present invention, terminal comprises:

data-storing-terminal counting means for counting a number of one or more communication terminals which stores data, for each piece of data, in accordance with each piece of data information, transmitted from each another communication terminal, indicating the each piece of data stored in the another communication terminal, and stored contents in storage means in the own communication terminal;

communication terminal count estimation means for estimating a number of zero or more communication terminals mutually transmitting data at a same timing in accordance with a counting result of the data-storing-terminal counting means;

adjustment reference value calculation means for calculating an adjustment reference value for limiting a number of zero or more communication terminals estimated by the communication terminal count estimation means to a preset permissible number or less;

determination means for determining whether or not to permit transmission of data stored in the storage means in accordance with the adjustment reference value calculated by the adjustment reference value calculation means; and data transmission means for transmitting the data to a communication terminal not storing the data, when the determination means permits transmission of the data.

A communication method, according to the present invention, comprises:

a data-storing-terminal counting step for counting a number of one or more communication terminals which stores data, for each piece of data, in accordance with each piece of data information, transmitted from each another communication terminal, indicating the each piece of data stored in the another communication terminal, and stored contents in storage means in the own terminal;

a communication terminal count estimation step for estimating a number of zero or more communication terminals mutually transmitting data at a same timing in accordance with the counting result of the data-storing-terminal counting step;

an adjustment reference value calculation step for calculating an adjustment reference value for limiting the estimated number of zero or more communication terminals of the communication terminal count estimation step to a preset permissible number or less;

a determination step for determining whether or not to permit transmission of data stored in the storage means in accordance with the calculated adjustment reference value of the adjustment reference value calculation step; and a data transmitting step for transmitting the data to a communication terminal not storing the data, when permitting transmission of the data in the determination step.

A storage medium, according to the present invention, on which a communication program is stored, the program causes a computer to perform:

data-storing-terminal counting processing of counting a number of one or more communication terminals which stores data, for each piece of data, in accordance with each piece of data information, transmitted from each another communication terminal, indicating the each piece of data stored in the another communication terminal, and stored contents in storage means in the own terminal;

communication terminal count estimation processing of estimating a number of zero or more communication terminals mutually transmitting data at a same timing in accordance with a counting result in the data-storing-terminal counting processing;

adjustment reference value calculation processing of calculating an adjustment reference value for limiting a number of zero or more communication terminals estimated in the communication terminal count estimation processing to a preset permissible number or less;

determination processing of determining whether or not to permit transmission of data stored in the storage means in accordance with the adjustment reference value calculated in the adjustment reference value calculation processing; and data transmission processing of transmitting the data to a communication terminal not storing the data, when transmission of the data is permitted in the determination processing.

A communication system, according to the present invention, includes a plurality of communication terminals according to any one of the modes.

Advantageous Effects of Invention

The present invention is able to satisfactorily suppress increase in data collision count even when a number of communication terminals connected to a communication network increases.

BRIEF DESCRIPTION OF DRAWINGS

FIG. 12 is an explanatory diagram illustrating a configuration example of content information stored in a storage unit according to the second exemplary embodiment.

FIG. 16 is an explanatory diagram illustrating a configuration example of content information stored in a storage unit according to the third exemplary embodiment.

DESCRIPTION OF EMBODIMENTS

First Exemplary Embodiment

Figure 1:
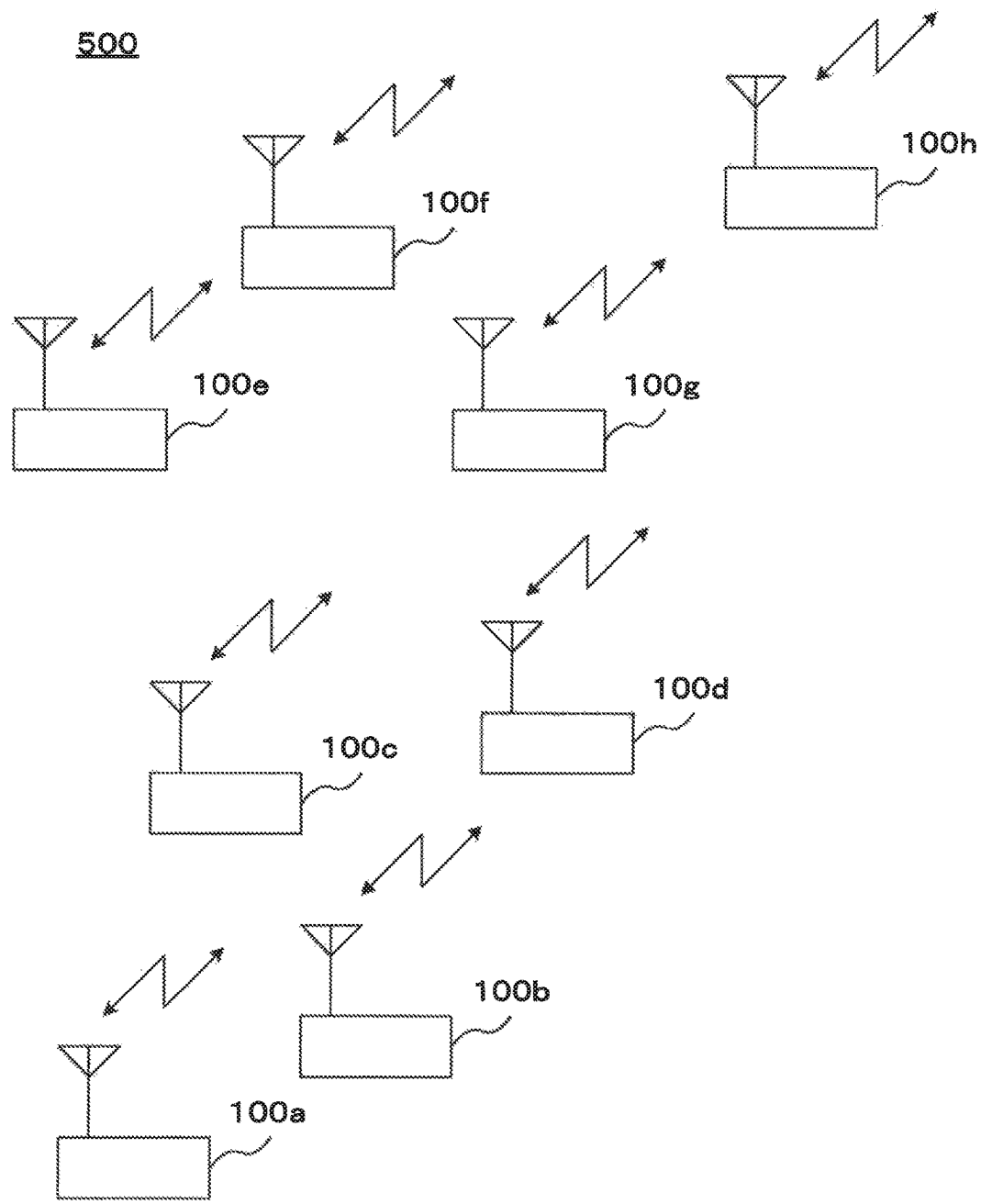
FIG. 1 is a block diagram illustrating a configuration example of a wireless communication system including a communication terminal according to a first exemplary embodiment of the present invention.

A communication terminal 100 according to a first exemplary embodiment of the present invention will be described with reference to drawings. FIG. 1 is a block diagram illustrating a configuration example of a wireless communication system 500 including the communication terminal 100 according to the first exemplary embodiment of the present invention. While FIG. 1 illustrates communication terminals 100a to 100h as examples of the communication terminal 100, it is assumed that the communication terminals 100a to 100h have mutually same configurations in this example and are collectively referred to as communication terminals 100. The communication terminal 100 has a wireless communication function. Furthermore, the wireless communication function includes, for example, a wireless LAN connection function, and it is assumed that the respective communication terminals 100 included in the wireless communication system 500, according to the present exemplary embodiment, are able to communicate with one another in, for example, an ad hoc mode. Additionally, the respective communication terminals 100a to 100h may be connected to a wired communication network and be configured to communicate with one another through the wired communication network.

Figure 2:
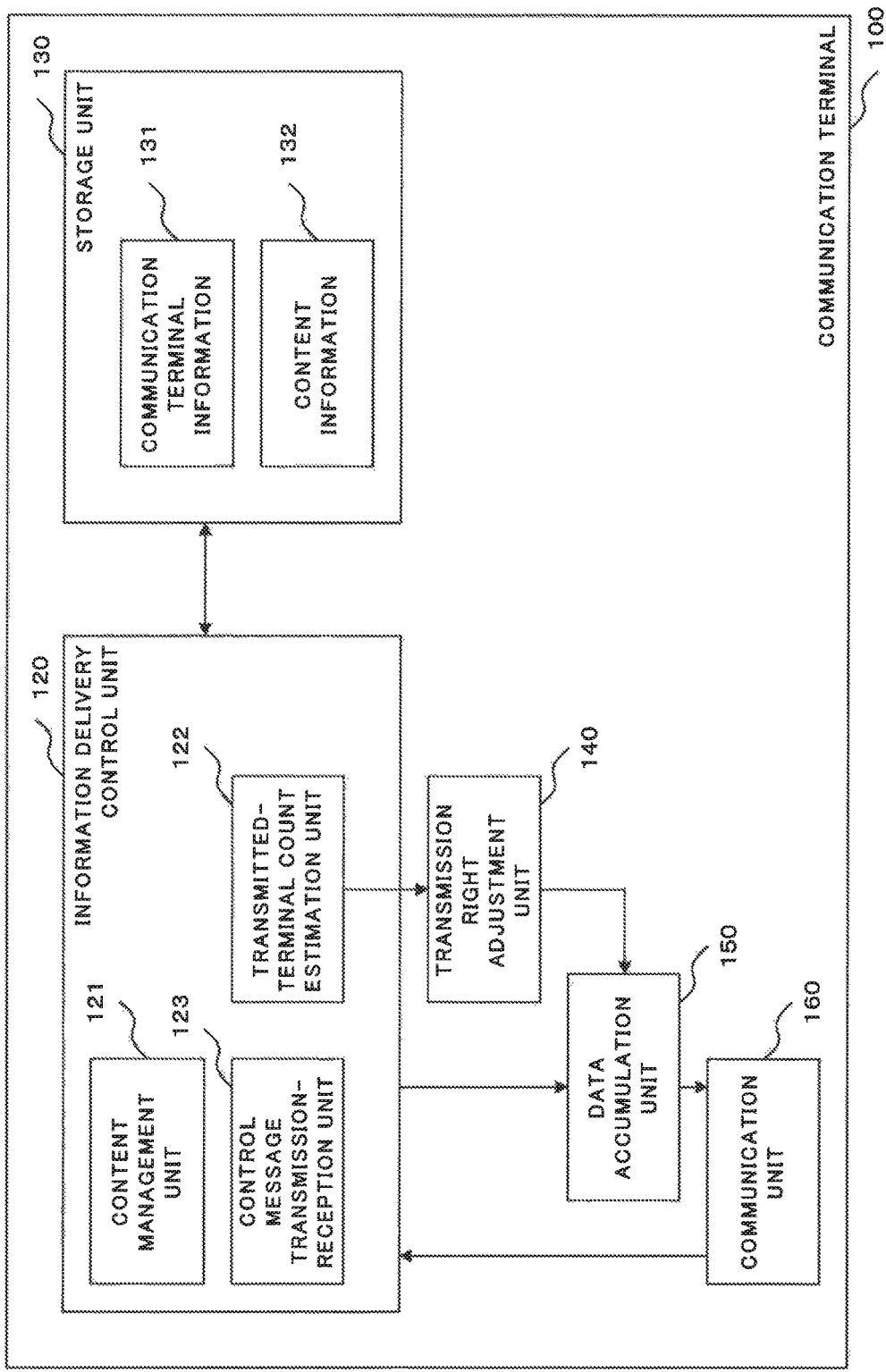
FIG. 2 is a block diagram illustrating a configuration example of the communication terminal according to the first exemplary embodiment of the present invention.

FIG. 2 is a block diagram illustrating a configuration example of the communication terminal 100 according to the first exemplary embodiment of the present invention. As illustrated in FIG. 2, the communication terminal 100 according to the first exemplary embodiment of the present invention includes an information delivery control unit 120, a storage unit 130, a transmission right adjustment unit 140, a data accumulation unit 150, and a communication unit 160.

Each of the information delivery control unit 120, the transmission right adjustment unit 140, and the data accumulation unit 150 is, for example, a central processing unit (CPU) performing processing in accordance with program control. Specifically, each of the information delivery control unit 120 and the transmission right adjustment unit 140 is, for example, a CPU performing processing in accordance with control by application software operating on an operating system (OS) loaded on the communication terminal 100. The storage unit 130 is, for example, a memory. The communication unit 160 is, for example, a wireless LAN communication module controlled by a kernel of the OS.

The storage unit 130 stores communication terminal information 131 and content information 132. Further, the storage unit 130 stores content. Note that the content may be any one of a text file, an image data file, and a voice data file, or a multimedia data file containing at least two of a text, an image, and a voice. Further, being stored in the storage unit 130 in the communication terminal 100 may be simply referred to as being stored in the communication terminal 100.

Figure 3:
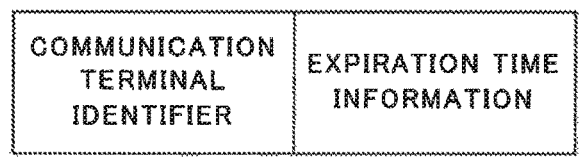
FIG. 3 is an explanatory diagram illustrating a configuration example of communication terminal information according to the first exemplary embodiment.

FIG. 3 is an explanatory diagram illustrating a configuration example of the communication terminal information 131. The respective communication terminals 100 transmit and receive to and from one another, on a predetermined cycle, a control message including a content list being a list of identifiers of one or more pieces of content stored in the storage unit 130, and a communication terminal identifier indicating a source communication terminal 100. Then, as indicated in FIG. 3, a piece of communication terminal information 131 is generated so as to include a communication terminal identifier indicating a source of a control message included in the control message received from another communication terminal 100, and expiration time information indicating an expiration time of the communication terminal information 131.

The communication terminal identifier indicates a source of a control message by, for example, an Internet Protocol (IP) address, a user name, and a communication terminal name. The storage unit 130 of a communication terminal 100 (for example, the communication terminal 100a) stores respective pieces of communication terminal information 131 including a communication terminal identifier indicating another communication terminal 100 (for example, the communication terminals 100b to 100h) communicable in an ad hoc mode.

The expiration time information is information indicating, for example, a date and time after an elapse of a time T from a date and time at which a control message is received. When a date and time indicated by the expiration time information arrives, the communication terminal information 131 is treated to have expired. Specifically, for example, the communication terminal information 130 is erased from the storage unit 130 after the date and time indicated by the expiration time information arrives.

When the time T is excessively long, for example, even after the communication terminal 100h indicated by the communication terminal identifier moves to a place where mutual communication with the communication terminal 100a in an ad hoc mode is not feasible, the communication terminal information continues to be stored in the storage unit 130 in the communication terminal 100a. Further, when the time T is excessively short, for example, even when the communication terminal 100h indicated by the communication terminal identifier is able to mutually communicate with the communication terminal 100a in an ad hoc mode, the communication terminal information is erased from the storage unit 130 in the communication terminal 100a. Accordingly, it is appropriate to set the time T to a time longer than a transmission cycle of control messages.

Figure 4:
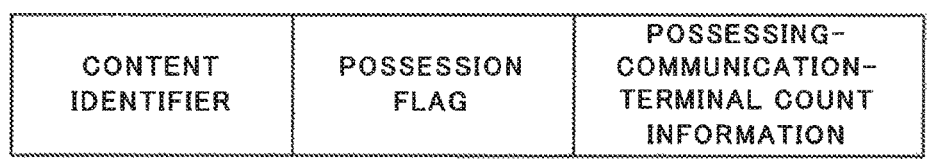
FIG. 4 is an explanatory diagram illustrating a configuration example of content information stored in a storage unit according to the first exemplary embodiment.

FIG. 4 is an explanatory diagram illustrating a configuration example of the content information 132 stored in the storage unit 130. As indicated in FIG. 4, the content information 132 includes, for example, a content identifier, a possession flag, and possessing-communication-terminal count information.

The content identifier is an identifier predetermined for distinguishing content in the wireless communication system 500. The possession flag is a flag indicating whether or not content indicated by a content identifier is stored in the own terminal 100. Specifically, for example, when content indicated by a content identifier is stored in the storage unit 130, the value of the possession flag is set to 1, and when the content is not stored, the value of the possession flag is set to 0.

The possessing-communication-terminal count information is information indicating a number of zero or more communication terminals 100 storing the content, out of one or more communication terminals 100 indicated in communication terminal identifiers in one or more valid (an expiration time has not yet arrived) pieces of communication terminal information 131 stored in the storage unit 130.

For example, when the value of the possession flag is set to 1, and a value indicated in the possessing-communication-terminal information (e.g. 99) and a number of communication terminals 100 indicated by the communication terminal identifiers in valid pieces of communication terminal information 131 stored in the storage unit 130 (e.g. 99) are identical, the following is indicated.

That is to say, it is indicated that every one of the own terminal 100 (e.g. the communication terminal 100a) and communication terminals 100 adjacent to the own terminal 100 (e.g. the communication terminals 100b and 100c) stores content indicated by a content identifier. In other words, it is indicated that stored contents of the respective communication terminals 100 (e.g. the communication terminals 100a to 100c) are mutually synchronized with respect to the content indicated by the content identifier. Note that the adjacent communication terminal 100 refers to another communication terminal 100 directly communicable in an ad hoc mode in a wireless LAN by the communication unit 160.

The information delivery control unit 120 includes a control message transmission-reception unit 123, a content management unit 121, and a transmitted-terminal count estimation unit 122.

The control message transmission-reception unit 123 mutually transmits and receives a control message to and from an adjacent communication terminal 100 through the data accumulation unit 150 and the communication unit 160. When a predetermined timing to transmit a control message arrives, the control message transmission-reception unit 123 generates and broadcasts a control message. Note that the control message transmission-reception unit 123 creates a content list included in a control message, in accordance with, for example, a content identifier and a possession flag respectively indicated by content information stored in the storage unit 130.

The control message transmission-reception unit 123 repeatedly transmits control messages on a predetermined cycle or as needed. When a plurality of pieces of content are stored in the storage unit 130 in the own terminal 100, the control message transmission-reception unit 123 generates and transmits, for example, a control message as described below. That is to say, the control message transmission-reception unit 123 generates, for example, a control message including a content list based on content identifiers of all pieces of content stored in the storage unit 130. Further, the control message transmission-reception unit 123 generates, for example, a control message including a content list based on part of the content identifiers out of the content identifiers of the plurality of pieces of content and a control message including a content list based on the remaining content identifiers.

In other words, the control message transmission-reception unit 123 may divide a content list, and generate and transmit control messages including the divided content lists. Note that when transmitting a control message including a divided content list, the control message transmission-reception unit 123 includes information described below in the control message. That is to say, information such as information indicating that the content list is divided, and information indicating which number out of how many divided content lists the content list included in the control message is, is included. By including such information in a control message, the control message transmission-reception unit 123 is able to notify a destination that all pieces of content stored in the storage unit 130 in the own terminal 100 are indicated by content lists included in a plurality of control messages.

When receiving a control message, the control message transmission-reception unit 123 extracts a communication terminal identifier of the source from the control message. Then, the control message transmission-reception unit 123 generates a piece of communication terminal information 131 including the extracted communication terminal identifier and the aforementioned expiration time information, and causes the storage unit 130 to store the information.

Note that when a piece of communication terminal information 131 having a same communication terminal identifier as that in the newly generated piece of communication terminal information 131 is stored in the storage unit 130, the control message transmission-reception unit 123 may perform the following processing. That is to say, the control message transmission-reception unit 123 may update contents of the previously stored old communication terminal information 131 with contents of the new communication terminal information 131.

Further, the control message transmission-reception unit 123 may be configured to erase from the storage unit 130 communication terminal information 131 for which a date and time indicated by the expiration time information has arrived.

When a content list included in a control message includes a content identifier other than a content identifier included in content information stored in the storage unit 130, the control message transmission-reception unit 123 performs the following processing. That is to say, the control message transmission-reception unit 123 generates a piece of content information including the content identifier included in the message and having the value of the possession flag set to 0, and causes the storage unit 130 to store the information.

When a piece of content corresponding to content information 132 of which is stored in the storage unit 130 is newly stored in the source of a control message or erased by the source, the control message transmission-reception unit 123 performs the following processing. That is to say, the control message transmission-reception unit 123 updates the value indicated by the possessing-communication-terminal count information included in the content information 132 corresponding to the content. Specifically, when a piece of content corresponding to content information 132 of which is stored in the storage unit 130 is newly stored in the source of a control message, the control message transmission-reception unit 123 increases the value indicated by the possessing-communication-terminal count information included in the content information 132. Further, when a piece of content corresponding to content information 132 of which is stored in the storage unit 130 is erased by the source of a control message, the control message transmission-reception unit 123 decreases the value indicated by the possessing-communication-terminal count information included in the content information 132.

Note that in order to detect increase or decrease in the number of communication terminals 100 in which the respective pieces of content are stored, the control message transmission-reception unit 123 performs, for example, the following processing. That is to say, for example, the control message transmission-reception unit 123 causes the storage unit 130 to store a list of communication terminals 100 in which the respective pieces of content are stored, compares the list with a content list included in a control message, and detects increase or decrease in the number of communication terminals 100 in which the respective pieces of content are stored. Further, for example, the control message transmission-reception unit 123 stores the latest of content lists in control messages successively transmitted from another communication terminal 100 and, when receiving a new control message from the communication terminal 100, mutually compares a content list in the control message.

Then, the control message transmission-reception unit 123 detects increase or decrease in the number of communication terminals 100 in which the content is stored, by detecting change in content stored in the communication terminal 100, in accordance with the content identifier described in each content list.

The content management unit 121 has a function of transmitting and receiving content to and from another communication terminal 100 through the data accumulation unit 150 and the communication unit 160 and a function of managing content stored in the storage unit 130. When the control message transmission-reception unit 123 receives a control message transmitted by another communication terminal 100, the content management unit 121 performs the following processing in accordance with a content list included in the control message. That is to say, the content management unit 121 detects difference between content stored in the communication terminal 100 being the source of the control message and content stored in the own terminal 100. Specifically, for example, the content management unit 121 compares content identifiers in the content list included in the control message with content identifiers included in pieces of content information 132 in which the value of the possession flag is set to 1, in the storage unit 130. Then, when determining that there is difference between the two, the content management unit 121 transmits and receives the content corresponding to the difference to and from the communication terminal 100 being the source of the control message and synchronizes stored contents in the storage unit 130 and stored contents in the communication terminal 100. Specifically, the content management unit 121 transmits and receives the content corresponding to the content identifier being the difference, and synchronizes the stored contents in the storage unit 130 and the stored contents in the communication terminal 100.

When transmitting the content, the content management unit 121 reads the content corresponding to the difference from the storage unit 130 and transmits the content to the communication terminal 100 being the source of the control message through the data accumulation unit 150 and the communication unit 160. Further, when receiving content from another communication terminal 100, the content management unit 121 assembles the content data received through the communication unit 160 into the content and causes the storage unit 130 to store the content.

Here, when transmitting and receiving content data in order to synchronize stored contents of the storage unit 130 and stored contents of another communication terminal 100, the content management unit 121 uses either one of a push method and a pull method, or both. It is assumed that a method to be used is preset for each piece of content, and, for example, is specified in a content list included in a control message for each piece of content.

The push method is used in a case that, when receiving a control message from another communication terminal 100, the own terminal 100 voluntarily transmits content data not possessed by the communication terminal 100 but possessed by the own terminal 100. That is to say, in the push method, out of pieces of content stored in the storage unit 130, the content management unit 121 reads from the storage unit 130 a piece of content corresponding to a content identifier not included in the content list in the control message received from another communication terminal 100. Then, the content management unit 121 unicasts a message including the read content data to the communication terminal 100.

Further, the pull method is used in a case of, when receiving a control message from another communication terminal 100, receiving content data possessed by the communication terminal 100 but not possessed by the own terminal 100 from the communication terminal 100. In the pull method, out of pieces of content corresponding to content identifiers included in a content list in a control message received from another communication terminal 100, the content management unit 121 requests transmission of a piece of content not stored in the storage unit 130 to the another communication terminal 100. Specifically, for example, the content management unit 121 unicasts a request message requesting transmission of the content to the another communication terminal 100 through the data accumulation unit 150 and the communication unit 160. Then, the content management unit 121 extracts content data from a message unicast from the another communication terminal 100 in response to the request message, assembles the data into the content, and causes the storage unit 130 to store the content. When newly receiving content and causing the storage unit 130 to store the content, the content management unit 121 performs update processing of setting the value of the possession flag in the corresponding content information 132 to 1.

A communication terminal 100 may transmit content data by the aforementioned methods; however, simultaneous transmission of content data to a large number of communication terminals increases a processing load and may influence performance of the communication terminal 100. Accordingly, it is assumed that a number of one or more communication terminals k (k is an integer greater than or equal to 1) to which content can be transmitted simultaneously is preset to a communication terminal 100. Note that transmitting or receiving content data may be simply referred to as transmitting or receiving of content.

The transmitted-terminal count estimation unit 122 performs the following processing in accordance with a content list included in a control message from another communication terminal 100 received by the control message transmission-reception unit 123. That is to say, with respect to each piece of content being stored contents of the storage unit 130 in the own terminal 100, the transmitted-terminal count estimation unit 122 has a function of estimating a number of communication terminals to which the content is transmitted for synchronizing the own terminal 100 and all communication terminals indicated by the communication terminal identifiers in valid pieces of communication terminal information 131.

Then, the transmitted-terminal count estimation unit 122 inputs to the transmission right adjustment unit 140 estimated-communication-terminal count information indicating a smaller value of the sum of numbers of communication terminals estimated for respective pieces of content and the sum of the own terminal 100 and a number of communication terminals indicated by the communication terminal identifiers in valid pieces of communication terminal information 131.

The transmission right adjustment unit 140 has a function of controlling a time in which the own terminal 100 is able to transmit data (referred to as a transmission right). Specifically, the transmission right adjustment unit 140 controls whether or not content can be transmitted for each time slot demarcated in preset time intervals in the own terminal 100.

Figure 5:
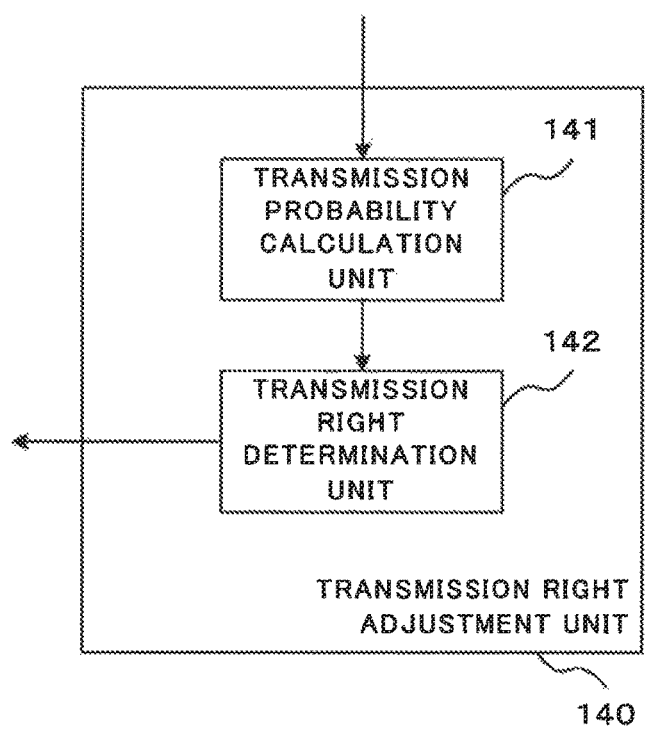
FIG. 5 is a block diagram illustrating a configuration example of a transmission right adjustment unit in the communication terminal according to the first exemplary embodiment of the present invention.

FIG. 5 is a block diagram illustrating a configuration example of the transmission right adjustment unit 140 in the communication terminal 100 according to the first exemplary embodiment of the present invention. The transmission right adjustment unit 140 includes a transmission probability calculation unit 141 and a transmission right determination unit 142.

The transmission probability calculation unit 141 calculates a transmission probability used for making an adjustment so that collision of data transmitted to communication terminals 100 the quantity of which being a number (value) indicated by estimated-communication-terminal count information input by the transmitted-terminal count estimation unit 122 can be suppressed by CSMA/CA in a MAC layer. Note that the transmission probability refers to a ratio of a predetermined permissible number of communication terminals transmitting data to an entire number of communication terminals. Specifically, the transmission probability calculation unit 141 calculates a transmission probability in accordance with a value indicated by estimated-communication-terminal count information input by the transmitted-terminal count estimation unit 122 and a maximum number of communication terminals permitted to transmit data at a same timing. Then, the transmission probability calculation unit 141 notifies the calculated transmission probability to the transmission right determination unit 142.

The transmission right determination unit 142 determines whether or not to permit data transmission in a predetermined period in accordance with a transmission probability calculated by the transmission probability calculation unit 141. Specifically, the transmission right determination unit 142 determines a time slot in which data can be transmitted out of predetermined time slots, in accordance with a transmission probability calculated by the transmission probability calculation unit 141. That is to say, the transmission right determination unit 142 probabilistically obtains whether or not to permit data transmission in a next time slot, in accordance with a transmission probability notified by the transmission probability calculation unit 141 and information about a preset time interval of time slots. Then, the transmission right determination unit 142 notifies the data accumulation unit 150 of transmission permission in a time period in a time slot in which transmission is permitted.

The data accumulation unit 150 accumulates a control message and content data transmitted to another communication terminal 100 from the control message transmission-reception unit 123 and the content management unit 121 in the information delivery control unit 120. Then, the data accumulation unit 150 inputs the accumulated data to the communication unit 160 in accordance with an instruction by the transmission right adjustment unit 140.

Figure 6:
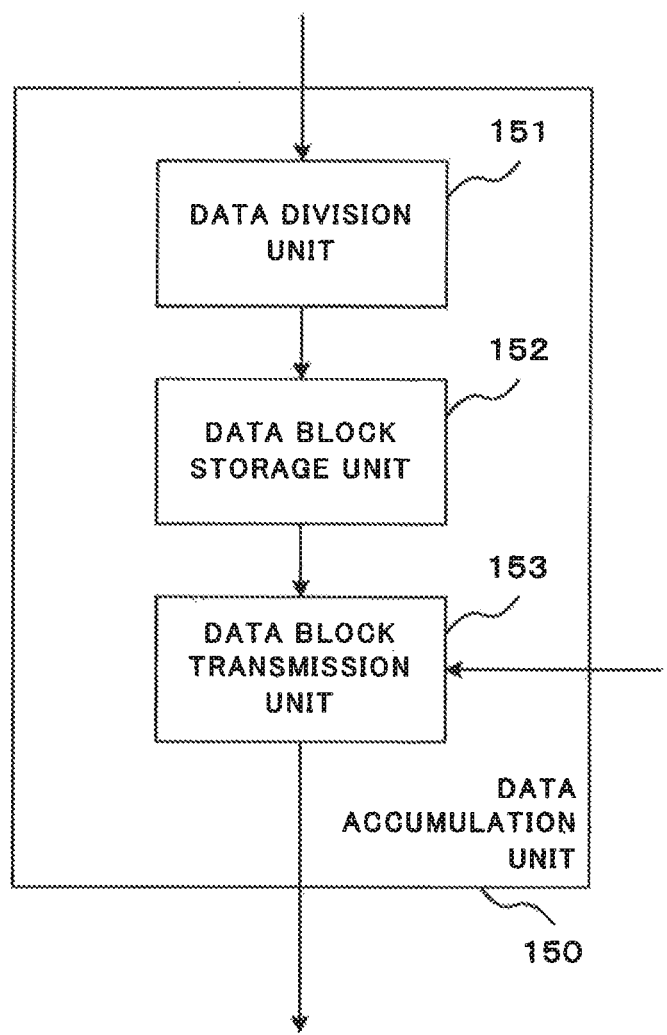
FIG. 6 is a block diagram illustrating a configuration example of a data accumulation unit in the communication terminal according to the first exemplary embodiment of the present invention.

FIG. 6 is a block diagram illustrating a configuration example of the data accumulation unit 150 in the communication terminal 100 according to the first exemplary embodiment of the present invention. The data accumulation unit 150 includes a data division unit 151, a data block storage unit 152, and a data block transmission unit 153.

The data division unit 151 divides a control message and application program data (e.g. content data to be transmitted) input from the information delivery control unit 120 into data blocks with a preset size. Then, the data division unit 151 causes the data block storage unit 152 to store the data blocks sequentially from the first data block.

The data block storage unit 152 is a storage medium such as a memory and stores a data block received from the data division unit 151.

The data block transmission unit 153 sequentially reads data blocks stored in the data block storage unit 152 in a period (time slot) in which transmission is permitted by the transmission right adjustment unit 140 and inputs the data blocks to the communication unit 160. Note that it is assumed that an order of reading data blocks from the data block storage unit 152 is same as an order of storing the data blocks into the data block storage unit 152.

The communication unit 160 performs network processing in a physical layer (PHY), a MAC layer, an IP layer, and a transport layer such as the Transmission Control Protocol (TCP) and the User Datagram Protocol (UDP).

Figure 7:
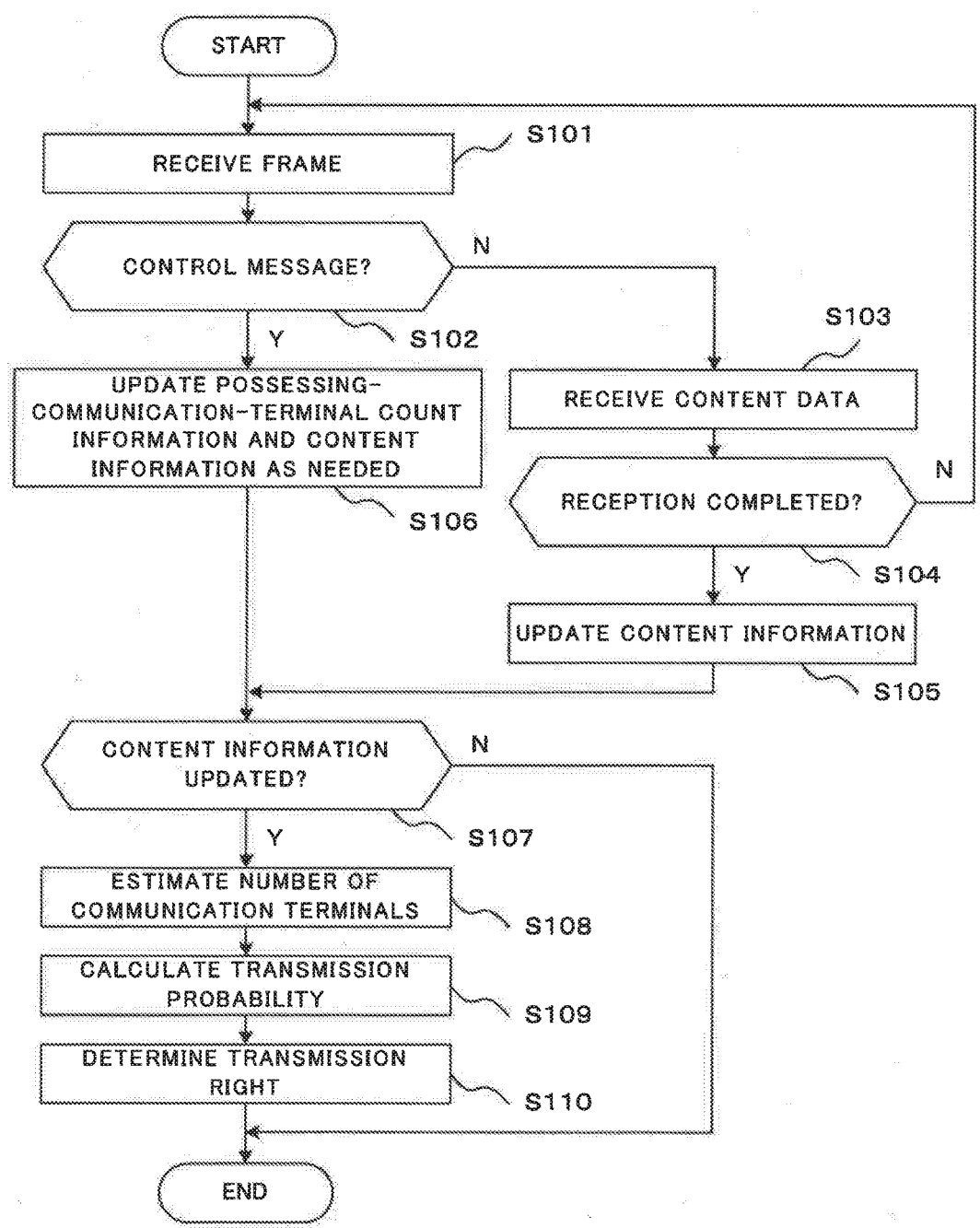
FIG. 7 is a flowchart illustrating an operation of the communication terminal according to the first exemplary embodiment of the present invention when the terminal receives a control message or content and determines a timing to transmit data.

Next, an operation of the communication terminal 100 according to the first exemplary embodiment of the present invention will be described. FIG. 7 is a flowchart illustrating an operation of the communication terminal 100 according to the first exemplary embodiment of the present invention when the terminal receives a control message or content, and determines a timing to transmit data.

When detecting reception of a frame (data) in a physical layer (PHY) (Step S101), the communication unit 160 inputs the data to the information delivery control unit 120 in accordance with network protocol processing in a MAC layer, an IP layer, a transport layer, and the like.

The information delivery control unit 120 assembles data received by the communication unit 160 and checks whether or not the data are data corresponding to a control message (Step S102). When the application data are not data corresponding to a control message (N in Step S102), that is, the application data are content data, the information delivery control unit 120 proceeds to processing in Step S103. Further, when the application data are data corresponding to a control message (Y in Step S102), the information delivery control unit 120 proceeds to processing in Step S106.

The content management unit 121 in the information delivery control unit 120 receives content data and performs reception processing of managing the data in the middle of reception, until the reception of the data is completed (Step S101, N in Step S102, Step S103, and N in Step S104).

When the reception of the content data is completed (Y in Step S104), the content management unit 121 causes the storage unit 130 to store the content based on the data received in the processing in Step S103 and proceeds to processing in Step S105.

The content management unit 121 updates content information 132 stored in the storage unit 130, in accordance with a new piece of content based on the data received in the processing in Step S105 (Step S105). Specifically, the content management unit 121 updates the value of the possession flag in content information 132 corresponding to the content. More specifically, for example, the content management unit 121 updates the value of the possession flag from 0 indicating the content not being stored to 1 indicating the content being stored.

Furthermore, as described above, in order to receive content data in a pull type, previous reception of a control message including a content list including a content identifier corresponding to the content is required. Accordingly, it is assumed that the control message transmission-reception unit 123 previously generates content information 132 of the content in response to a received control message and causes the storage unit 130 to store the information.

Further, when the content is received by a push type, content information 132 of the content may not be generated. Accordingly, the content management unit 121 checks whether or not the content information 132 of the content is stored in the storage unit 130. When the content information 132 of the content is not stored in the storage unit 130, the content management unit 121 newly generates a piece of content information 132 in which the possession flag is set to a value (e.g. 1) indicating that the own terminal 100 stores the content, and the possessing-communication-terminal count information is set to 1 (a communication terminal 100 being the source of the control message possesses the content). Then, the content management unit 121 causes the storage unit 130 to store the generated content information 132. Note that when the content information 132 of the content is already stored in the storage unit 130, the content management unit 121 updates the value of the possession flag similarly to the case of the pull type.

When receiving a control message (Y in Step S102), the control message transmission-reception unit 123 generates communication terminal information 131 of a communication terminal 100 being the source of the control message or updates the expiration time information in the communication terminal information 131. Further, the control message transmission-reception unit 123 compares a content list included in the control message with content information 132 stored in the storage unit 130 and updates or generates content information 132 as needed (Step S106).

Specifically, when the content list included in the control message includes a content identifier not included in the content information 132, the control message transmission-reception unit 123 newly generates a piece of content information 132 corresponding to the content. At this time, the control message transmission-reception unit 123 generates a piece of content information 132 including the content identifier of the content. Then, in the content information 132, the control message transmission-reception unit 123 sets a value (e.g. 0) indicating that the own terminal does not possess the content to the possession flag and sets 1 (a communication terminal 100 being the source of the control message possesses the content) to the possessing-communication-terminal count information.

Further, when a content identifier in the content information 132 is included in a content list included in a received control message, and it is newly indicated by the control message that content corresponding to the content identifier is stored in a communication terminal 100 being the source, the following processing is performed.

That is to say, the control message transmission-reception unit 123 adds 1 to the value of the possessing-communication-terminal count information in the content information 132 including the content identifier. When a piece of content is erased from a communication terminal 100 being the source of the control message, the control message transmission-reception unit 123 subtracts 1 from the value of the possessing-communication-terminal count information in the content information 132 including the content identifier of the content. Note that a method of the control message transmission-reception unit 123 detecting increase or decrease in a number of communication terminals 100 storing each piece of content has been described above, and therefore is omitted.

When content information 132 is not updated or generated in the processing in Steps S105 and S106 (N in Step S107), the communication terminal 100 ends the processing. When content information 132 is updated or generated in the processing in Step S105 or S106 (Y in Step S107), in order to synchronize content corresponding to the updated content information 132 in the own terminal 100 and all communication terminals indicated by communication terminal identifiers in valid pieces of communication terminal information 131, the transmitted-terminal count estimation unit 122 performs processing of estimating a number of communication terminals to which the content is transmitted (Step S108).

Specifically, by use of equation (1) below, the transmitted-terminal count estimation unit 122 performs estimation processing of a number of communication terminals $C_i$ in a case of transmitting content i (i is a content identifier) corresponding to the content information 132.

$$C_i = \min(N_i \times k, N - N_i) \quad (1)$$

In equation (1), $N_i$ denotes a number of communication terminals storing the content i. Also, k denotes a number of destination communication terminals to which a communication terminal 100 is able to transmit content simultaneously. N denotes a number of communication terminals combining the own terminal 100 with communication terminals 100 being adjacent to the own terminal 100 (also referred to as adjacent communication terminals 100) indicated by a number of valid pieces of communication terminal information 131.

"$N_i \times k$" in equation (1) denotes a number of destination communication terminals when all of $N_i$ communication terminals 100 storing content i transmit the content to k other communication terminals 100, indicating a number of source communication terminals when the communication terminals 100 further transmit the content i. Further, "$N - N_i$" denotes a number of communication terminals not storing the content i out of the own terminal 100 and the adjacent communication terminals 100.

Accordingly, as indicated in equation (1), when the communication terminals 100 possessing the content i transmit the content i so that the own terminal 100 and all the adjacent communication terminals 100 store the content i, the value of the number of communication terminals $C_i$ becomes a smaller value of "$N_i \times k$" and "$N - N_i$."

Then, transmitted-terminal count estimation unit 122 calculates a number of communication terminals $C_i$ for every piece of content i. Then, a smaller value of the sum of numbers of communication terminals $C_i$ for every piece of content i and the number of communication terminals N being the sum of the own terminal 100 and the adjacent communication terminals 100 gives a number of communication terminals C required for mutually synchronizing stored contents of the respective communication terminals for every piece of content i. Further, the number of communication terminals C is also a number of communication terminals potentially performing simultaneous communication for mutually synchronizing stored contents of the respective communication terminals.

In other words, the number of communication terminals C is expressed by equation (2) below.

$$C = \min(\Sigma_i C_i, N) \quad (2)$$

The transmitted-terminal count estimation unit 122 estimates a value calculated by use of equations (1) and (2) as a number of communication terminals C potentially performing simultaneous communication. Then, the transmitted-terminal count estimation unit 122 inputs estimated-communication-terminal count information indicating the estimated number of communication terminals C to the transmission probability calculation unit 141 in the transmission right adjustment unit 140.

Note that, for example, when the own terminal 100 participates in the wireless communication system 500 but does not receive a control message from an adjacent communication terminal 100, a value as described below may be input to the transmission probability calculation unit 141 in the transmission right adjustment unit 140 as a number of communication terminals C. Specifically, for example, the transmitted-terminal count estimation unit 122 may input estimated-communication-terminal count information indicating 0 as an initial value of the number of communication terminals C to the transmission probability calculation unit 141 in the transmission right adjustment unit 140. In a case that estimated-communication-terminal count information indicating 0 is input to the transmission probability calculation unit 141 as an initial value of the number of communication terminals C, the own terminal 100 is able to freely transmit data even when a large number of adjacent communication terminals 100 are transmitting data simultaneously.

Further, the transmitted-terminal count estimation unit 122 may input a maximum number of adjacent communication terminals with which a communication terminal 100 is potentially able to communicate as an initial value of the number of communication terminals C to the transmission probability calculation unit 141 in the transmission right adjustment unit 140. When a maximum number of adjacent communication terminals with which a communication terminal 100 is potentially able to communicate is input to the transmission probability calculation unit 141 in the transmission right adjustment unit 140 as an initial value of the number of communication terminals C, data transmission is controlled depending on status (e.g. a number of adjacent communication terminals), and therefore collision can be suppressed.

Note that, without being limited to the case of being calculated by use of equations (1) and (2), the number of communication terminals C may be calculated by another method as long as a number of communication terminals potentially transmitting data simultaneously can be calculated.

The transmission probability calculation unit 141 calculates a transmission probability p by use of the number of communication terminals C estimated by the transmitted-terminal count estimation unit 122 in the processing in Step S108 and a preset maximum number of destination communication terminals $N_s$ transmitting data at a same timing (Step S109).

Specifically, the transmission probability calculation unit 141 calculates the transmission probability p by use of, for example, equation (3) below.

$$p = N_s / C \quad (3)$$

Note that the transmission probability p may be calculated by another method.

The transmission probability calculation unit 141 notifies the transmission right determination unit 142 of the transmission probability p calculated by use of equation (3).

The transmission right determination unit 142 causes a storage means (unillustrated: may be the storage unit 130) to store the transmission probability p notified by the transmission probability calculation unit 141. Then, when the current time becomes a time corresponding to a preset time slot $T_s$, the transmission right determination unit 142 determines whether or not to generate a transmission right being a right to transmit data, in accordance with the transmission probability p stored in the storage means (Step S110).

For example, when a number of communication terminals C estimated in the processing in Step S108 is 100 and a preset maximum number of destination communication terminals $N_s$ transmitting data at a same timing is 10, the transmission probability p calculated by the transmission probability calculation unit 141 is obtained as p=10/100=0.1.

Then, when the time corresponding to the preset time slot $T_s$ arrives, the transmission right determination unit 142 determines to generate a transmission right in the time slot $T_s$ with a probability of 10 percent.

When determining to generate a transmission right, the transmission right determination unit 142 notifies the data accumulation unit 150 of the determination result. The data accumulation unit 150 uses the transmission right generated in the processing in Step S110 for data transmission control. That is to say, when notified of determination to generate a transmission right by the transmission right determination unit 142, the data accumulation unit 150 transmits data.

Note that the transmission right determination unit 142 may simultaneously determine transmission rights in preset M time slots. Then, the transmission right determination unit 142 causes the storage means to store a time slot identifier (time slot ID) for distinguishing the time slots, a time slot starting time, and existence or nonexistence of a transmission right. The transmission right determination unit 142 may notify the data accumulation unit 150 of whether or not transmission is permitted, at a timing corresponding to a starting time of each time slot, in accordance with stored contents in the storage means.

Figure 8:
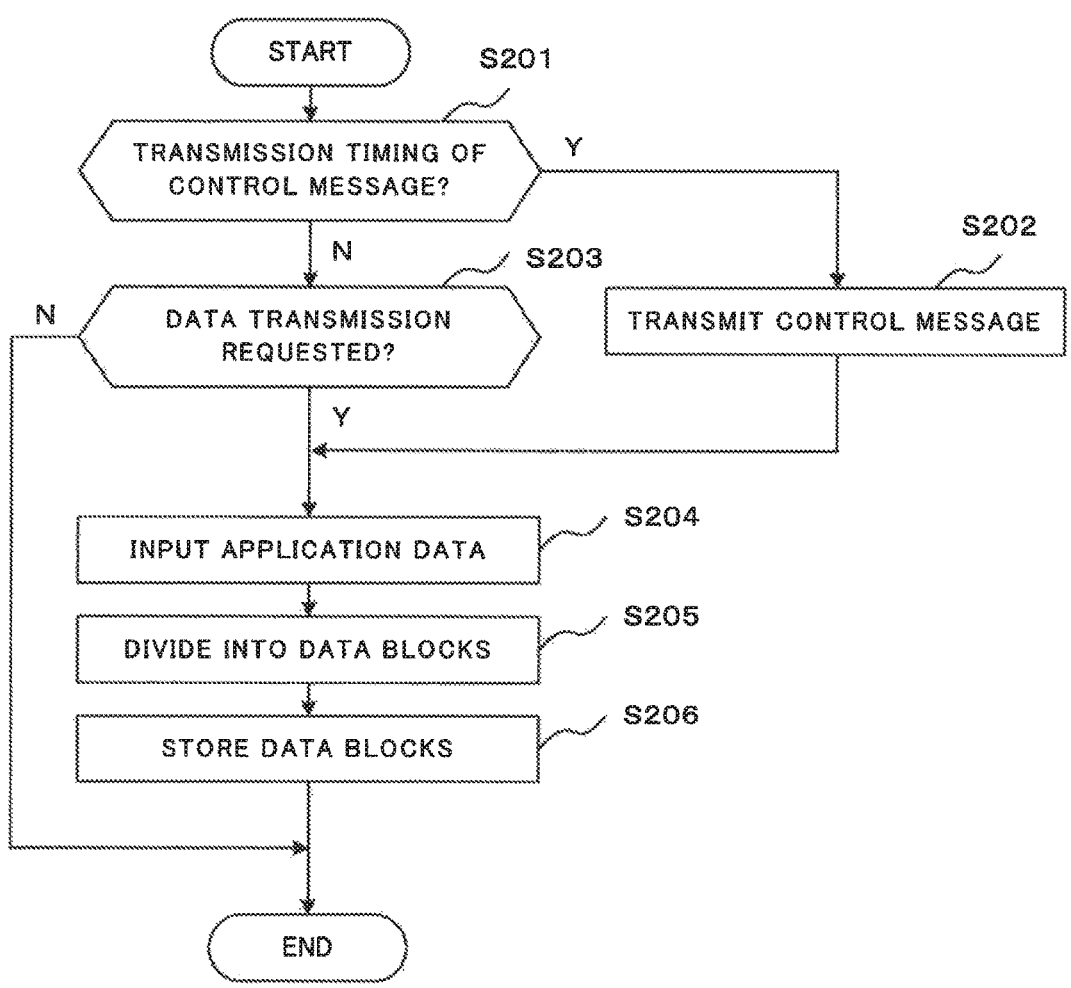
FIG. 8 is a flowchart illustrating an operation of transmitting a control message or content by the communication terminal according to the first exemplary embodiment.

Next, an operation of transmitting a control message or content by the communication terminal 100 according to the first exemplary embodiment of the present invention will be described. FIG. 8 is a flowchart illustrating an operation of transmitting a control message or content by the communication terminal 100 according to the first exemplary embodiment.

The control message transmission-reception unit 123 in the information delivery control unit 120 determines whether or not the present is a predetermined timing arriving on a predetermined cycle to transmit a control message, by use of, for example, a timer (Step S201). When the present is determined to be the predetermined timing (Y in Step S201), the control message transmission-reception unit 123 broadcasts a control message (Step S202).

Specifically, in the processing in Step S202, the control message transmission-reception unit 123 reads a piece of content information 132 from the storage unit 130, refers to the possession flag, and creates a content list being a list of content identifiers of pieces of content stored in the storage unit 130. The control message transmission-reception unit 123 generates a control message including the created content list and an identifier of the own terminal 100. Then, the control message transmission-reception unit 123 inputs the generated control message to the data accumulation unit 150 and proceeds to processing in Step S204.

When the control message transmission-reception unit 123 determines that the present is not the predetermined timing (N in Step S201), the content management unit 121 in the information delivery control unit 120 determines whether or not a transmission request exists (Step S203). Note that the transmission request includes a transmission request (corresponding to the aforementioned pull method) for transmitting content from another communication terminal 100 and a transmission request (corresponding to the aforementioned push method) for transmitting content to another communication terminal 100. In the case of the pull method, for example, a request message is received from another communication terminal 100, and, in the case of the push method, determination is made by referring to a content list included in a control message received from another communication terminal 100.

Then, when determining that a transmission request does not exist (N in Step S203), the content management unit 121 ends the processing.

When determining that a transmission request exists (Y in Step S203), the content management unit 121 performs the following processing. That is to say, the content management unit 121 reads content data from the storage unit 130 in response to the transmission request. Then, the content management unit 121 divides the read data into preset-sized pieces of data called application data and inputs the application data to the data accumulation unit 150 (Step S204). Note that application data obtained by division into data units are referred to as an application data unit.

The data division unit 151 further divides an application data unit obtained by division in the processing in Step S204 into preset-sized data units (Step S205). The data obtained by division into a preset size is referred to as a data block.

The data division unit 151 causes the data block storage unit 152 to store data divided into data blocks (Step S206).

Figure 9:
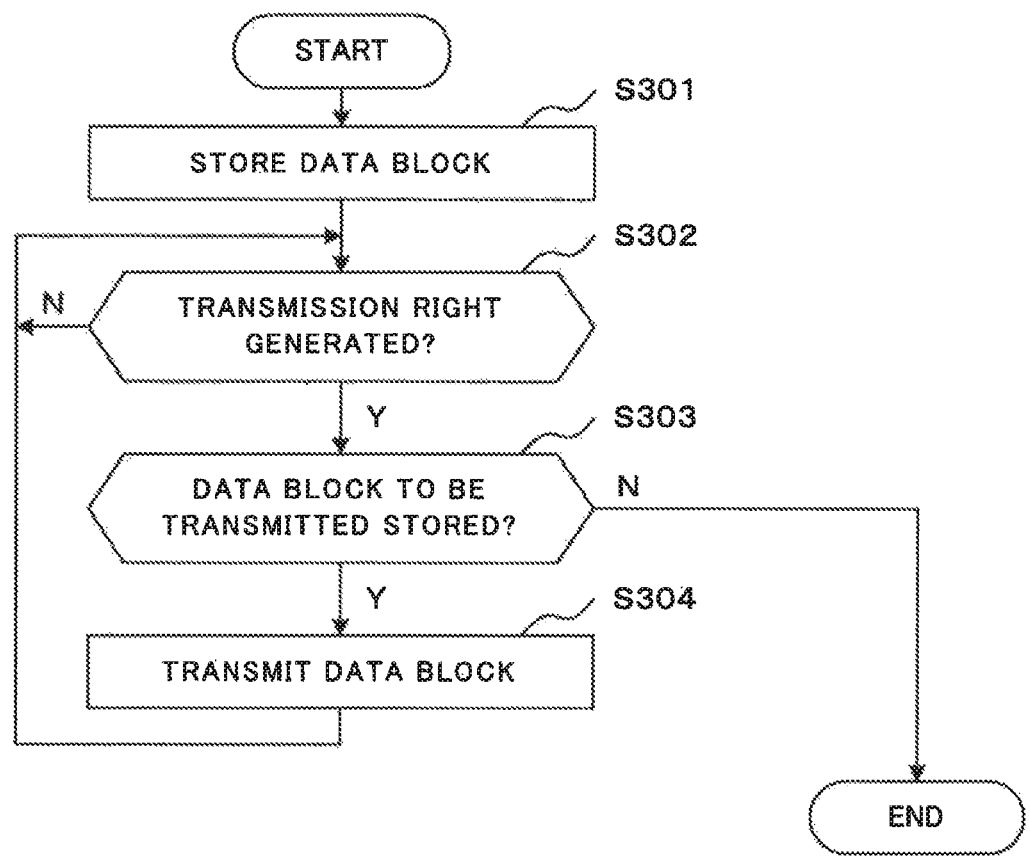
FIG. 9 is a flowchart illustrating an operation of transmitting data by the communication terminal according to the first exemplary embodiment of the present invention.

Next, an operation of transmitting data by the communication terminal 100 according to the first exemplary embodiment of the present invention will be described. FIG. 9 is a flowchart illustrating an operation of transmitting data by the communication terminal 100 according to the first exemplary embodiment of the present invention.

First, when a data block is stored in the data block storage unit 152 in the data accumulation unit 150 (Step S301), the data block transmission unit 153 determines whether or not determination to generate a transmission right is notified by the transmission right determination unit 142 (Step S302). Then, when determination to generate a transmission right is not notified by the transmission right determination unit 142 (N in Step S302), the data block transmission unit 153 waits until determination to generate a transmission right is notified. Further, when determination to generate a transmission right is notified by the transmission right determination unit 142 (Y in Step S302), the data block transmission unit 153 performs the following processing. That is to say, the data block transmission unit 153 checks whether or not a data block to be transmitted is stored in the data block storage unit 152 (Step S303).

When a data block to be transmitted is not stored in the data block storage unit 152 (N in Step S303), the data block transmission unit 153 ends the processing. Further, when a data block to be transmitted is stored in the data block storage unit 152 (Y in Step S303), the data block transmission unit 153 reads the data block from the data block storage unit 152. Then, the data block transmission unit 153 inputs the read data block to the communication unit 160.

The communication unit 160 performs transmission processing when a data block is input (Step S304) and proceeds to the processing in Step S302. Then, the processing in Steps S302 to S304 is repeated until all data blocks to be transmitted are transmitted. Note that transmission processing of data (data block) performs network processing in a transport layer such as TCP or UDP, network processing in an IP layer, and network processing in a MAC layer, in accordance with processing in a physical layer (PHY). Note that the data transmission processing in the communication unit 160 is similar to common network processing in layers from a physical layer to a transport layer, and therefore detailed description thereof is omitted.

Figure 10:
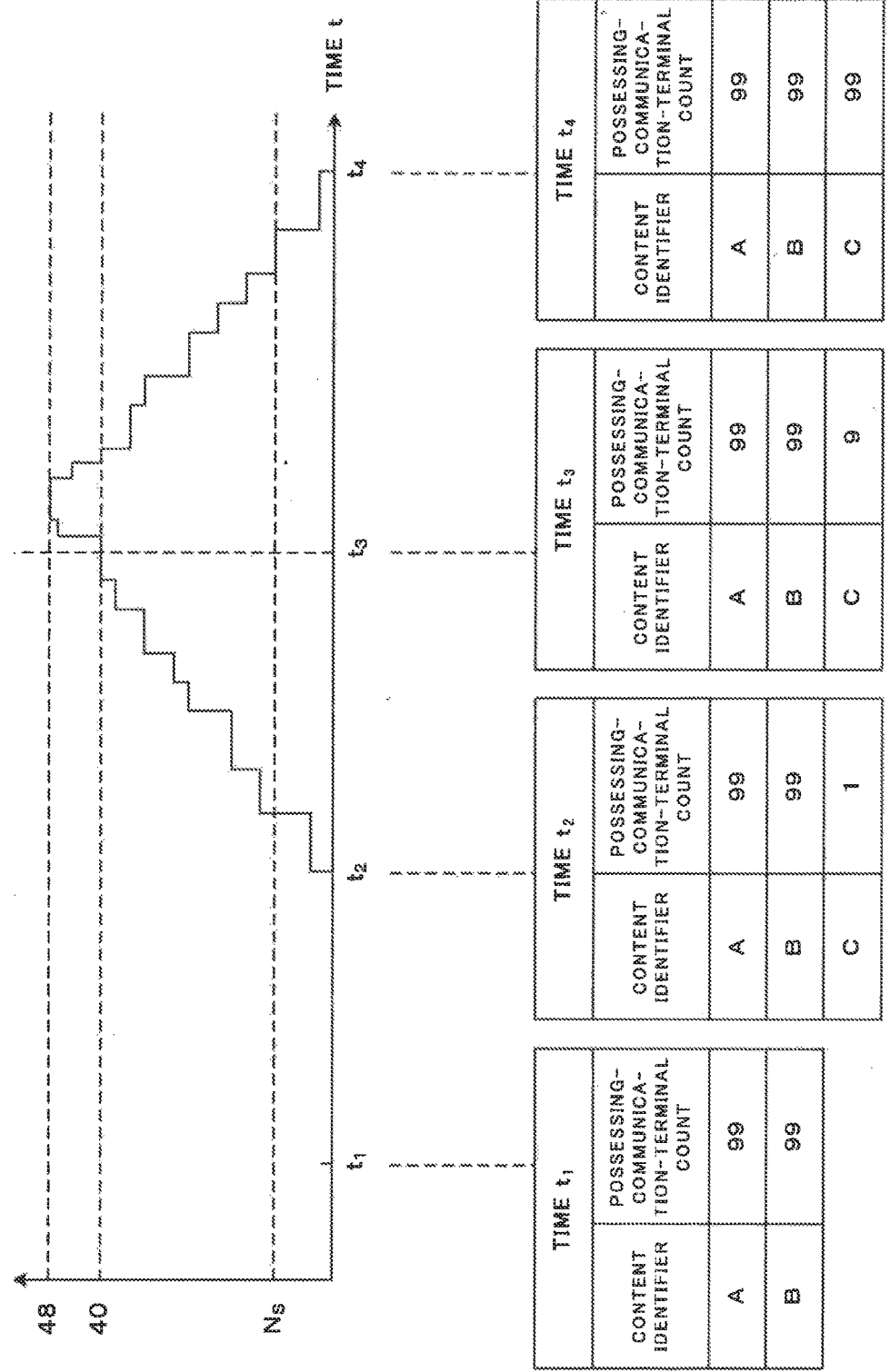
FIG. 10 is an explanatory diagram illustrating transition of a number of communication terminals according to the first exemplary embodiment.

Next, transition of a number of communication terminals estimated in the processing in Step S108 indicated in FIG. 7 will be described. FIG. 10 is an explanatory diagram illustrating transition of a number of communication terminals.

Note that it is assumed that there are three pieces of content: content A with a content identifier A, content B with a content identifier B, and content C with a content identifier C. It is further assumed that there are 100 communication terminals 100 in total: the own terminal 100 and 99 adjacent communication terminals 100. Then, it is assumed that a number of communication terminals k to which a content can be transmitted simultaneously is set to k=4 for each communication terminal 100. It is further assumed that a number of communication terminals $N_s$ that can transmit data at a same timing is set to $N_s$=10.

It is assumed that, at a time $t_1$ indicated in FIG. 10, the storage unit 130 in the own terminal 100 stores content information 132 described below. That is to say, the content information 132 includes content information about the content A with the content identifier A and content information about the content B with the content identifier B. Further, the possession flag in either piece of the content information about the content A and the content B is set to 1. In other words, the storage unit 130 in the own terminal 100 stores both the content A and content B. Further, the value of the possessing-communication-terminal count information in either piece of the content information about the content A and the content B is 99. In other words, each of the 99 adjacent communication terminals 100 stores the content A and the content B, and each of the 100 communication terminals 100 including the own terminal 100 stores the content A and content B.

Then, since N=100 in equation (1) at the time $t_1$ with respect to both pieces of the content A and the content B, and also $N_A$, $N_B$=100, the value of $C_A$ and the value of $C_B$ are both 0. Therefore, a number of communication terminals C=$C_A$+$C_B$=0 is obtained.

It is assumed that, at a time $t_2$, one communication terminal 100 stores the content C with the content identifier C, and the content C is notified by a control message. Then, since N=100 in equation (1) with respect to the content C, and also $N_C$=1, $C_C$=min(1×4,100−1)=4 is obtained. Therefore, the number of communication terminals C=$C_A$+$C_B$+$C_C$=4 is obtained.

It is assumed that, after the time $t_2$, each communication terminal 100 receives data of the content C either directly from the one communication terminal 100 or indirectly through another communication terminal 100 and stores the data. Accordingly, it is assumed that, at a time $t_3$, it is confirmed through a control message that 10 communication terminals 100 including the own terminal 100 store the content C. Then, since the value of the possessing-communication-terminal count information in the content information about the content C is 9, $C_C$=min((9+1)×4,100−(9+1))=40 is obtained. Therefore, the number of communication terminals C=$C_A$+$C_B$+$C_C$=40 is obtained.

When the time $t_3$ elapses, a number of communication terminals 100 receiving the content C either directly from the one communication terminal 100 or indirectly through another communication terminal 100 and storing the content increases, and the value of the number of communication terminals $C_C$ gradually decreases. Consequently, as illustrated in FIG. 10, the value of the number of communication terminals C also gradually decreases.

Then, at a time $t_4$, the content C is stored in all the communication terminals 100 and the value of the possessing-communication-terminal count information in the content information about the content C becomes 99 obtained by subtracting the own terminal 100 from the 100 communication terminals 100. Accordingly, since N=100 in equation (1) with respect to the content C as well at the time $t_4$, and also $N_C$=100, the value of $C_C$ also becomes 0. Therefore, the number of communication terminals C=$C_A$+$C_B$+$C_C$=0 is obtained.

The communication terminal 100 according to the present exemplary embodiment estimates a number of communication terminals C being destinations of content, in accordance with a received control message and stored contents in the storage unit 130. Then, the communication terminal 100 calculates a transmission probability p in accordance with the estimated number of communication terminals C and a number of communication terminals $N_s$ that can perform data transmission simultaneously. For each time slot independently managed by the own terminal, when determining that data can be transmitted, the communication terminal 100 transmits content data in accordance with the calculated transmission probability p. Consequently, when the wireless communication system 500 includes a large number of communication terminals 100, the communication terminal 100 controls a number of communication terminals 100 transmitting data simultaneously, in accordance with the probability.

Accordingly, even when increase in communication terminals creates an environment in which a large number of communication terminals are packed in mutual communication ranges, and frequent collisions by CSMA/CA in a MAC layer, normally causing degradation of throughput, occur, increase in data collision count can be satisfactorily suppressed. Additionally, degradation of throughput can be satisfactorily suppressed to enable efficient data transmission. Further, reliable data delivery can be achieved.

Further, each communication terminal 100 according to the present exemplary embodiment independently manages a time slot demarcated in preset time intervals and determines whether or not transmission is permitted depending on the time slot. In other words, each communication terminal 100 in the wireless communication system 500 is not required to perform clustering or time synchronization. Therefore, increase in data collision count can be satisfactorily suppressed without performing very difficult time synchronization between respective communication terminals 100. Additionally, degradation of throughput can be satisfactorily suppressed and efficient data transmission can be achieved.

Second Exemplary Embodiment

Figure 11:
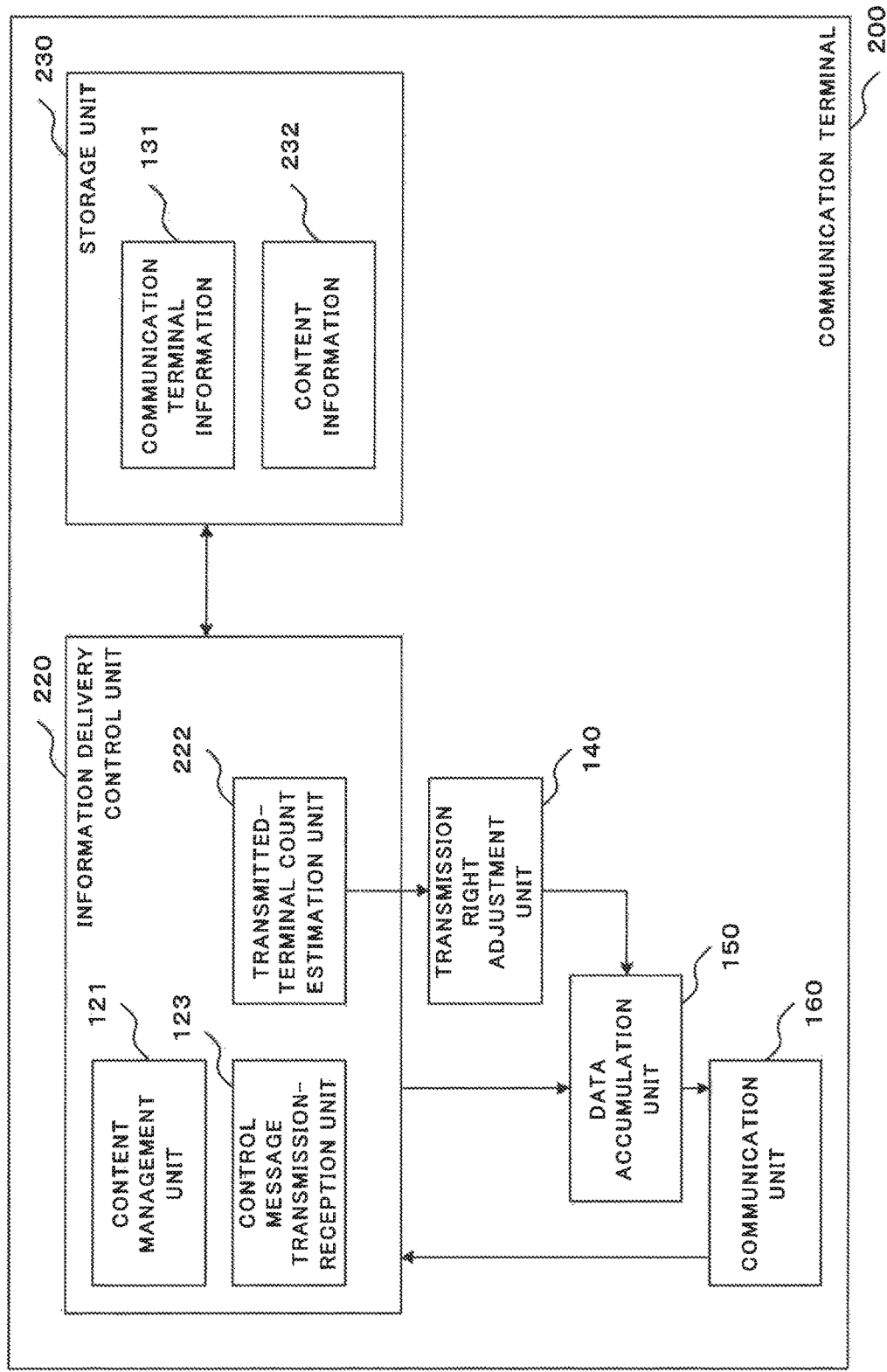
FIG. 11 is a block diagram illustrating a configuration example of a communication terminal according to a second exemplary embodiment of the present invention.

Next, a communication terminal 200 according to a second exemplary embodiment of the present invention will be described. FIG. 11 is a block diagram illustrating a configuration example of the communication terminal 200 according to the second exemplary embodiment of the present invention. As illustrated in FIG. 11, the communication terminal 200 according to the second exemplary embodiment of the present invention includes an information delivery control unit 220 and a storage unit 230. The remaining configuration is similar to the configuration of the communication terminal 100 according to the first exemplary embodiment illustrated in FIG. 2, and therefore a corresponding component is given a same reference sign as that in FIG. 2 and description thereof is omitted.

The information delivery control unit 220 in the communication terminal 200 according to the second exemplary embodiment of the present invention includes a transmitted-terminal count estimation unit 222. The transmitted-terminal count estimation unit 122 according to the first exemplary embodiment inputs estimated-communication-terminal count information indicating a value calculated by use of aforementioned equations (1) and (2) to the transmission right adjustment unit 140.

By contrast, when new content not stored in the own terminal 200 and an adjacent communication terminal 200 (hereinafter referred to as adjacent communication terminals 200 or the like) is stored in an adjacent communication terminal 200 or the like, the transmitted-terminal count estimation unit 222 according to the present exemplary embodiment estimates a number of communication terminals communicating in order to transmit the content to all communication terminals 200. Then, when the content is stored in all the adjacent communication terminals 200 or the like, the transmitted-terminal count estimation unit 222 determines that the number of communication terminals communicating in order to transmit the content becomes 0. The transmitted-terminal count estimation unit 222 according to the present exemplary embodiment estimates a number of communication terminals by such an estimation method and inputs communication terminal information indicating the estimation result to the transmission right adjustment unit 140. Note that a new piece of content not stored in an adjacent communication terminal 200 or the like is also referred to as new content.

The storage unit 230 stores content information 232. FIG. 12 is an explanatory diagram illustrating a configuration example of the content information 232 stored in the storage unit 230. As indicated in FIG. 12, the content information 232 includes estimated-communication-terminal count information in addition to the configuration of the content information 132 according to the first exemplary embodiment.

The control message transmission-reception unit 123 newly generates a piece of content information 232 including estimated-communication-terminal count information, correspondingly to new content. The estimated-communication-terminal count information according to the present exemplary embodiment is information indicating an estimated value of a number of communication terminals potentially performing simultaneous communication in order to transmit new content to all adjacent terminals 200 or the like.

Figure 13:
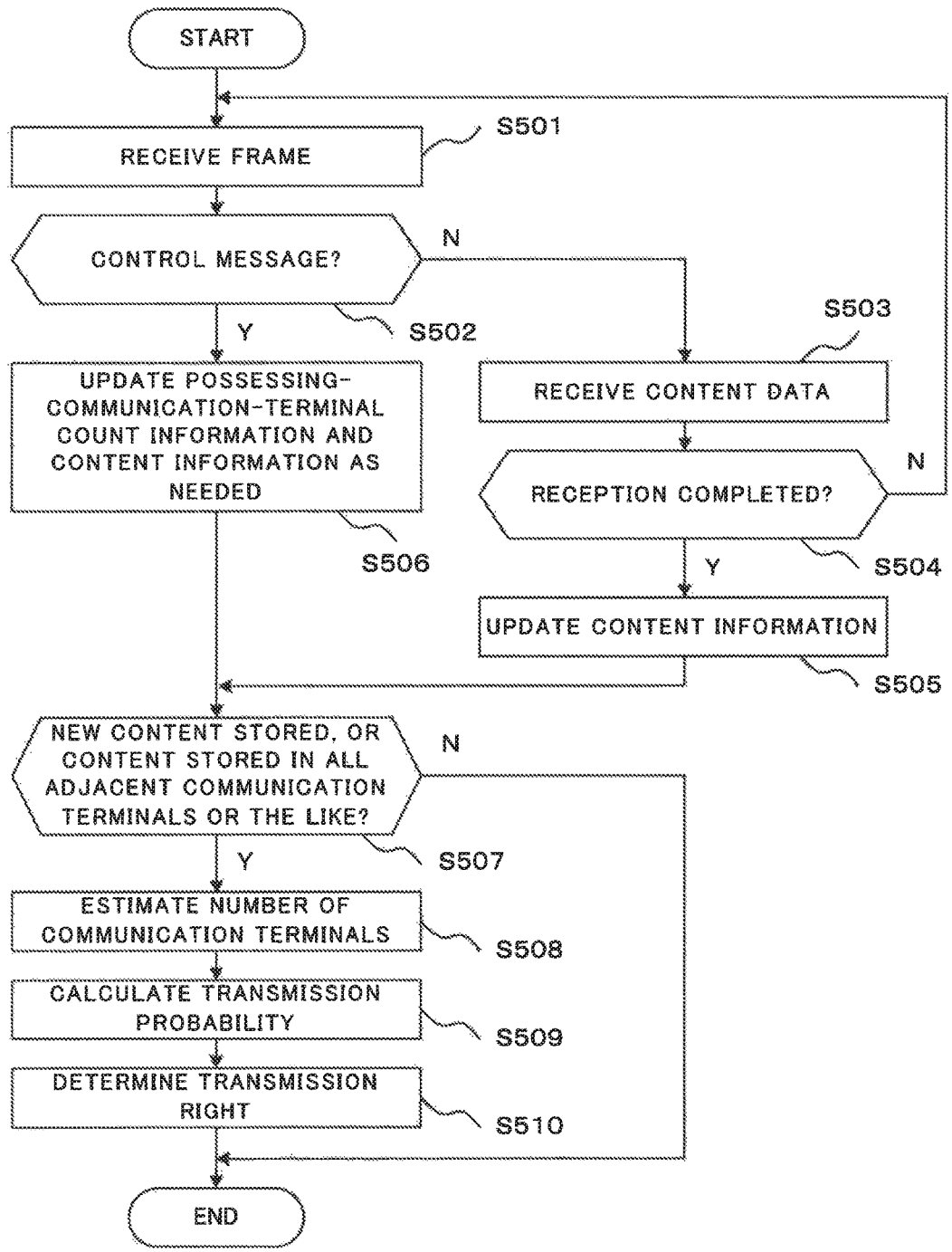
FIG. 13 is a flowchart illustrating an operation of the communication terminal according to the second exemplary embodiment of the present invention when the terminal receives a control message or content and determines a timing to transmit data.

Next, an operation of the communication terminal 200 according to the second exemplary embodiment of the present invention will be described. FIG. 13 is a flowchart illustrating an operation of the communication terminal 200 according to the second exemplary embodiment of the present invention when the terminal receives a control message or content and determines a timing to transmit data.

In the example illustrated in FIG. 13, processing in Steps S501 to S506, S509, and S510 is similar to the processing in Steps S101 to S106, S109, and S110 illustrated in FIG. 7, respectively, and therefore description thereof is omitted.

Note that only in a case of generating content information 232 in processing in Steps S505 and S506 corresponding to the operation of data reception by the communication terminal 100 according to the first exemplary embodiment in Steps S105 and S106, the content management unit 121 may perform the following processing. That is to say, the content management unit 121 may set the value indicated by the estimated-communication-terminal count information included in the content information 232 to 0, a blank space, or another number. The estimated-communication-terminal count information is updated in processing in Step S508.

The content management unit 121 updates content information 232 as needed in the processing in Steps S505 and S506. Then, when new content is stored in an adjacent communication terminal 200 or the like, or a piece of content is stored in all adjacent communication terminals 200 or the like (Y in Step S507), the content management unit 121 proceeds to the processing in Step S508. Otherwise (N in Step S507), the content management unit 121 ends the processing.

Note that whether or not new content is stored in an adjacent communication terminal 200 or the like is determined by whether or not the content management unit 121 creates a new piece of content information 232. Further, in the processing in Step S506, when a value indicated by the possessing-communication-terminal count information in content information 232 of a piece of content is equal to a number of adjacent communication terminals 200, it is possible to determine that the piece of content is stored in all the adjacent communication terminals 200 or the like.

When new content is stored in an adjacent communication terminal 200 or the like (Y in Step S507), the transmitted-terminal count estimation unit 222 performs the following processing. That is to say, in the processing in Step S508, the transmitted-terminal count estimation unit 222 estimates a number of communication terminals with respect to the new content and sets the estimated value to the estimated number of communication terminals in the content information 232 (Step S508). Specifically, transmitted-terminal count estimation unit 222 calculates a number of communication terminals $C_i$ for transmitting new content i (i is a content identifier) to all communication terminals 200, by use of, for example, equation (4) below.

$$C_i = \min(k^j, N-k^j) \qquad (4)$$

Here, k denotes a number of destination communication terminals to which a communication terminal 200 is able to transmit content simultaneously. N denotes a number of communication terminals combining the own terminal 200 and a communication terminal 200 adjacent to the own terminal 200, being indicated by a number of valid pieces of communication terminal information 131. Also, j is a minimum positive integer satisfying $k^j \geq N-k^j$.

Equation (4) expresses that a value of a number of communication terminals $C_i$ for transmitting new content i to all communication terminals 200 is a smaller value of "$k^j$" and "$N-k^j$." Note that "$k^j$" denotes a number of transmitted communication terminals assuming that a communication terminal 200 first storing content i transmits the content i to other k communication terminals 200, and a communication terminal 200 receiving the content i further transmits the content i. Further, "$N-k^j$" denotes a number of communication terminals not storing the content i assuming that a communication terminal 200 first storing the content i transmits the content i to other k communication terminals 200, and a communication terminal 200 receiving the content i further transmits the content i. A maximum value of a number of communication terminals $C_i$ for transmitting the content i to all the communication terminals 200 is estimated to be, as expressed by equation (4), a smaller value of "$k^j$" in a case of a communication terminal 200 possessing the content i transmitting the content i to other k communication terminals 200, and "$N-k^j$" in a case of a communication terminal 200 not possessing the content i receiving the content i from a communication terminal 200 possessing the content i.

When detecting a piece of new content i, the transmitted-terminal count estimation unit 222 calculates a communication terminal $C_i$ for every piece of detected new content i and stores $C_i$ in the estimated-communication-terminal count information in content information 232 corresponding to each piece of new content i. Then, a number of communication terminals C required for mutually synchronizing stored contents in each communication terminal 200 with respect to every content i is a smaller value of the sum of numbers of communication terminals $C_i$ indicated by the estimated-communication-terminal count information in content information 232 corresponding to every piece of content i stored in the storage unit 230 and the number of communication terminals N being the sum of the own terminals 200 and the adjacent communication terminals 200. An equation for calculating C is similar to equation (2) described in the operation according to the first exemplary embodiment except that the value of the estimated-communication-terminal count information in corresponding content information 232 is used as a number of communication terminals $C_i$ with respect to content i, and therefore description thereof is omitted.

When a piece of content is stored in all the adjacent communication terminals 200 or the like, the number of communication terminals 200 being destinations of the content becomes 0. Accordingly, the content management unit 121 updates the value indicated by the estimated-communication-terminal count information in the content information 232 to 0 and updates the value of the number of communication terminals C again by use of equation (2) (Step S508).

Furthermore, when new content is stored in the storage unit 230, a number of communication terminals $C_i$ estimated in the processing in Step S508 is set to the estimated-communication-terminal count information in the content information 232, according to the present exemplary embodiment. Then, when the content is stored in all the adjacent communication terminals 200 or the like, the value of the estimated-communication-terminal count information is set to 0.

Figure 14:
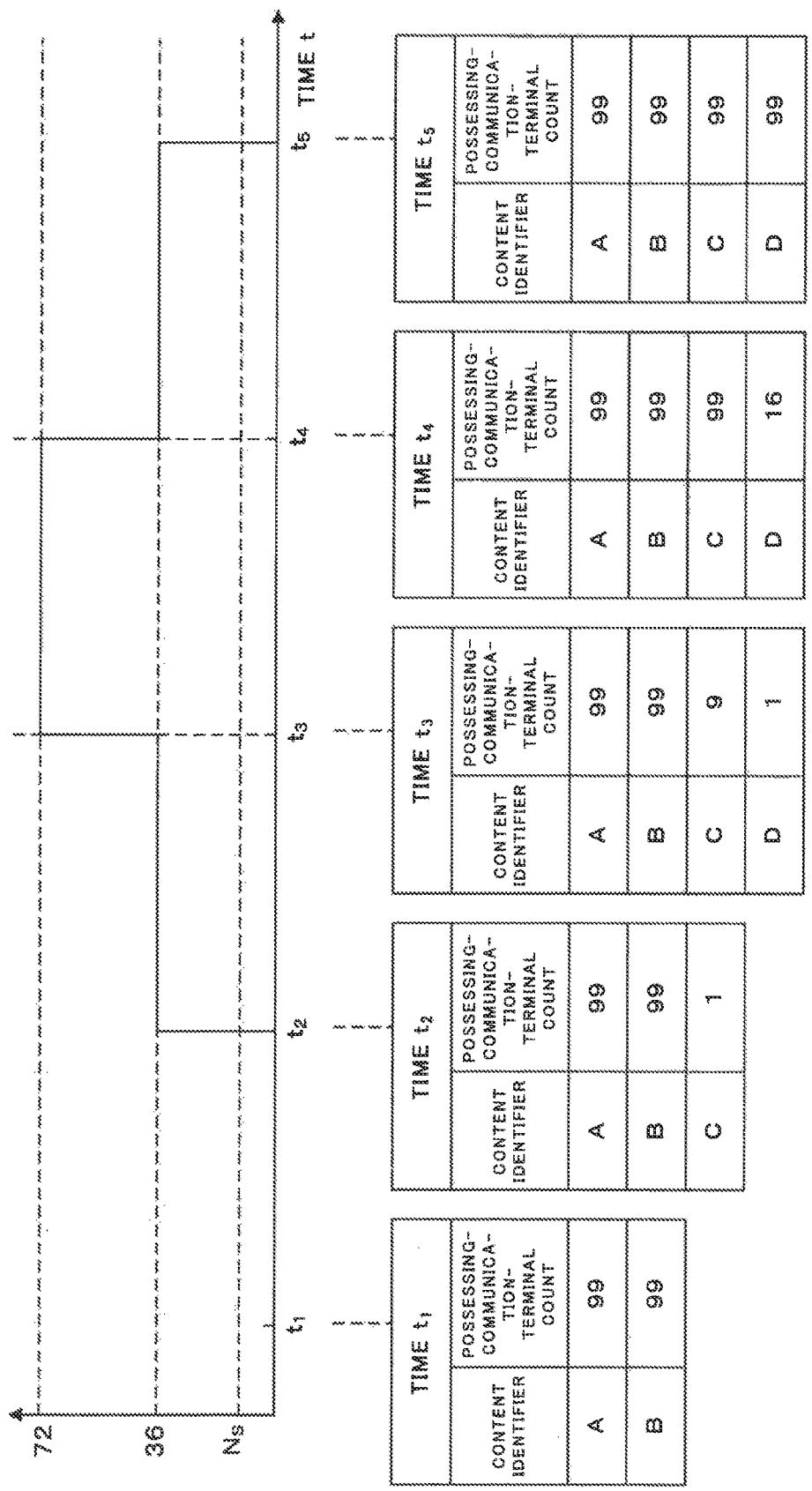
FIG. 14 is an explanatory diagram illustrating transition of a number of communication terminals according to the second exemplary embodiment.

FIG. 14 is an explanatory diagram illustrating transition of a calculated number of communication terminals according to the present exemplary embodiment.

Note that it is assumed that there are four pieces of content: content A with a content identifier A, content B with a content identifier B, content C with a content identifier C, and content D with a content identifier D. It is further assumed that there are 100 communication terminals 200 in total: the own terminal 200 and 99 adjacent communication terminals 200. Then, it is assumed that a number of communication terminals k to which content can be transmitted simultaneously is set to k=4 for each communication terminal 200. It is further assumed that a number of communication terminals $N_s$ that can transmit data at a same timing is set to $N_s$=10.

It is assumed that, at a time $t_1$ indicated in FIG. 14, the storage unit 230 in the own terminal 200 stores content information 232 described below. That is to say, the content information 232 includes content information about the content A with the content identifier A and content information about the content B with the content identifier B. Further, the possession flag in either piece of the content information about the content A and the content B is set to 1. In other words, the storage unit 230 in the own terminal 200 stores both the content A and the content B. Further, the value of the possessing-communication-terminal count information in either piece of the content information about the content A and the content B is 99. In other words, each of the 99 adjacent communication terminals 200 stores the content A and the content B, and each of the 100 communication terminals 200 including the own terminal 200 stores the content A and the content B.

Then, since both pieces of the content A and the content B are stored in all the communication terminals 200 and the value of the estimated-communication-terminal count information in the respective pieces of content information 232 corresponding to the content A and content B is 0 at the time $t_1$, the value of $C_A$ and the value of $C_B$ are both 0. Therefore, a number of communication terminals $C=C_A+C_B=0$ is obtained.

It is assumed that, at a time $t_2$, it is detected by a control message received from one communication terminal 200 that the communication terminal 200 stores the content C with the content identifier C. Then, from equation (4), a number of communication terminals with respect to the content C $C_C=\min(4^3, 100-4^3)=\min(64,36)=36$ is obtained. Therefore, $C=C_A+C_B+C_C=36$ is obtained. Note that, in this example, substitution of j=2 into equation (4) yields $4^2<100-4^2$, and substitution of j=3 yields $4^3>100-4^3$. Therefore, j=3 is employed.

It is further assumed that, at a time $t_3$, it is detected by a control message received from one communication terminal 200 that the communication terminal 200 stores the content D with the content identifier D. Then, from equation (4), a number of communication terminals with respect to the content D $C_D=\min(4^3,100-4^3)=\min(64,36)=36$ is obtained. Therefore, $C=C_A+C_B+C_C+C_D=72$ is obtained. Note that j=3 is employed in this example, as described above.

Then, it is assumed that, at a time $t_4$, the content C is stored in all the adjacent communication terminals 200 or the like. Then, the value of the estimated-communication-terminal count information in the content information 232 about the content C is updated from a previous value of 36 to 0. Therefore, $C_C=0$ is obtained, and therefore $C=C_A+C_B+C_C+C_D=36$ is obtained.

It is further assumed that, at a time $t_5$, the content D is stored in all the adjacent communication terminals 200 or the like. Then, the value of the estimated-communication-terminal count information in the content information 232 about the content D is updated from a previous value of 36 to 0. Therefore, $C_D=0$ is obtained, and therefore $C=C_A+C_B+C_C+C_D=0$ is obtained.

According to the present exemplary embodiment, when new content i is added to the own terminal 200 or new content i is notified by a control message received from another adjacent communication terminal 200, the transmitted-terminal count estimation unit 222 estimates a number of communication terminals $C_i$ for transmitting the new content i to all adjacent communication terminals 200 or the like, and estimates a number of communication terminals C from the value of the estimated-communication-terminal count information for every piece of content. Accordingly, the transmission probability calculation unit 141 uses the value of the number of communication terminals $C_i$ estimated for a certain piece of content i for calculation of a transmission probability p until transmission of the content i to the adjacent communication terminals 200 or the like is completed. Consequently, a maximum number of communication terminals $C_i$ is estimated in advance and is used until transmission of the content is completed, and therefore communication control matching actual communication status is considered to be feasible.

Further, the present exemplary embodiment is able to reduce frequency of estimation of a number of communication terminals C and calculation of a transmission probability p, and therefore is able to reduce a processing load of the communication terminal 200.

Third Exemplary Embodiment

Figure 15:
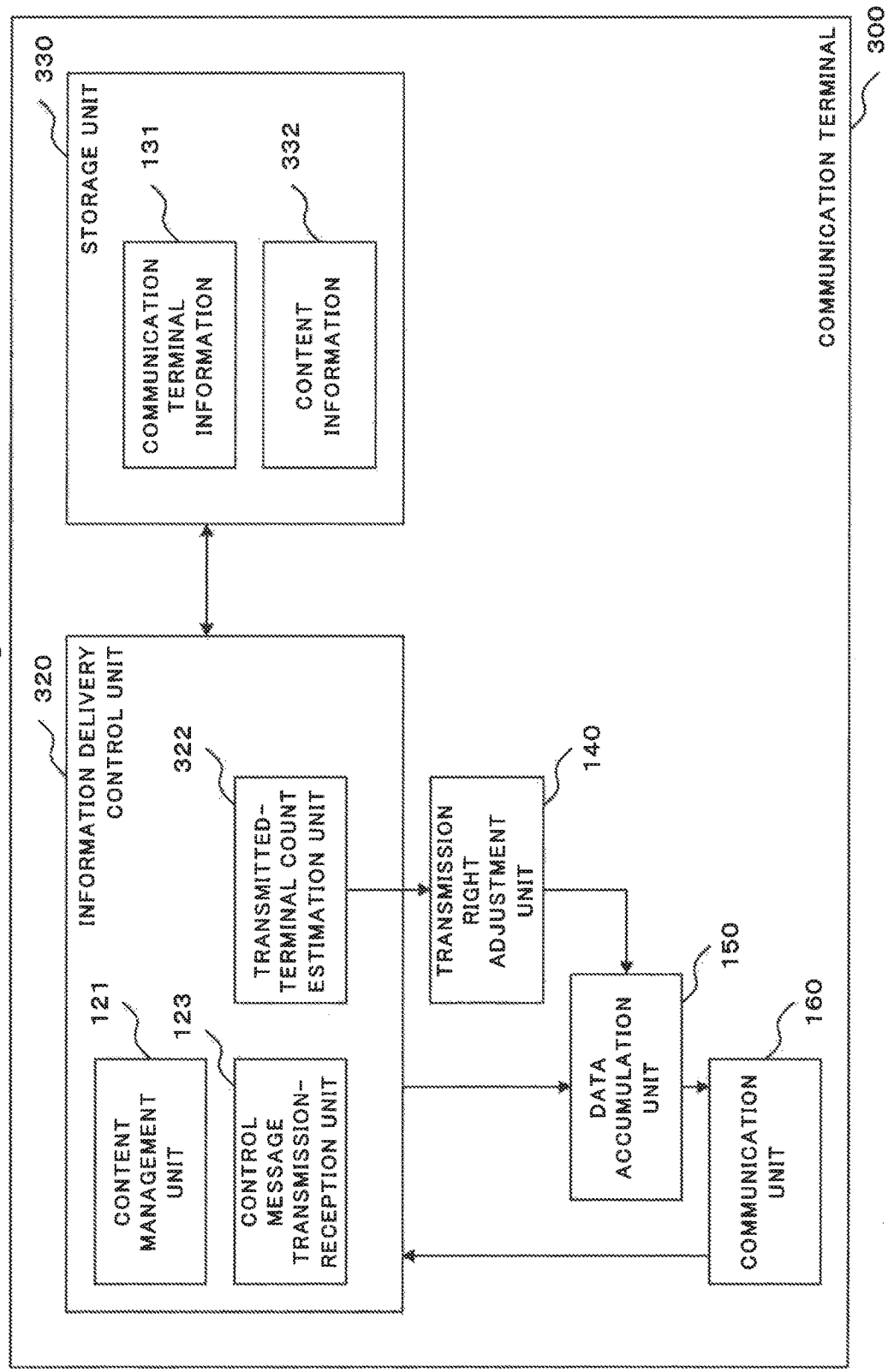
FIG. 15 is a block diagram illustrating a configuration example of a communication terminal according to a third exemplary embodiment of the present invention.

Next a communication terminal 300 according to a third exemplary embodiment of the present invention will be described. FIG. 15 is a block diagram illustrating a configuration example of the communication terminal 300 according to the third exemplary embodiment of the present invention. As illustrated in FIG. 15, the communication terminal 300 according to the third exemplary embodiment of the present invention includes an information delivery control unit 320 and a storage unit 330. The remaining configuration is similar to the configuration of the communication terminal 200 according to the second exemplary embodiment illustrated in FIG. 11, and therefore a corresponding component is given a same reference sign as that in FIG. 11 and description thereof is omitted.

The information delivery control unit 320 in the communication terminal 300 according to the third exemplary embodiment of the present invention includes a transmitted-terminal count estimation unit 322.

When detecting that new content is stored in an adjacent communication terminal 200 or the like, the transmitted-terminal count estimation unit 222 according to the second exemplary embodiment estimates a number of communication terminals communicating in order to transmit the content. Then, when determining that the content is stored in all adjacent communication terminals 200 or the like, the transmitted-terminal count estimation unit 222 determines that the number of communication terminals communicating in order to transmit the content becomes 0.

The transmitted-terminal count estimation unit 322 according to the present exemplary embodiment performs similar processing to the transmitted-terminal estimation unit 222 according to the second exemplary embodiment. Specifically, when detecting that new content not stored in the own terminal 300 and an adjacent communication terminal 300 (hereinafter referred to as adjacent communication terminals 300 or the like) is stored in an adjacent communication terminal 300 or the like, the transmitted-terminal count estimation unit 322 estimates a number of communication terminals communicating in order to transmit the content.

Then, when estimating the number of communication terminals, the transmitted-terminal count estimation unit 322 according to the present exemplary embodiment further estimates a time at which data transmission is completed, depending on content size, and, when the time arrives, determines that the number of communication terminals with respect to the content becomes 0. Then, the transmitted-terminal count estimation unit 322 notifies the estimation result to the transmission right adjustment unit 140.

The storage unit 330 stores content information 332. FIG. 16 is an explanatory diagram illustrating a configuration example of the content information 332 stored in the storage unit 330. As indicated in FIG. 16, the content information 332 includes transmission completion time information in addition to the configuration of the content information 232 according to the second exemplary embodiment.

When detecting new content, the control message transmission-reception unit 123 newly generates a piece of content information 332 including transmission completion time information. The control message transmission-reception unit 123 estimates a required transmission time required for transmitting the new content to all adjacent communication terminals 300. Then, the control message transmission-reception unit 123 calculates a transmission completion time being a time obtained by adding the estimated required transmission time to the current time. The transmission completion time information is information indicating a transmission completion time calculated by the control message transmission-reception unit 123.

Figure 17:
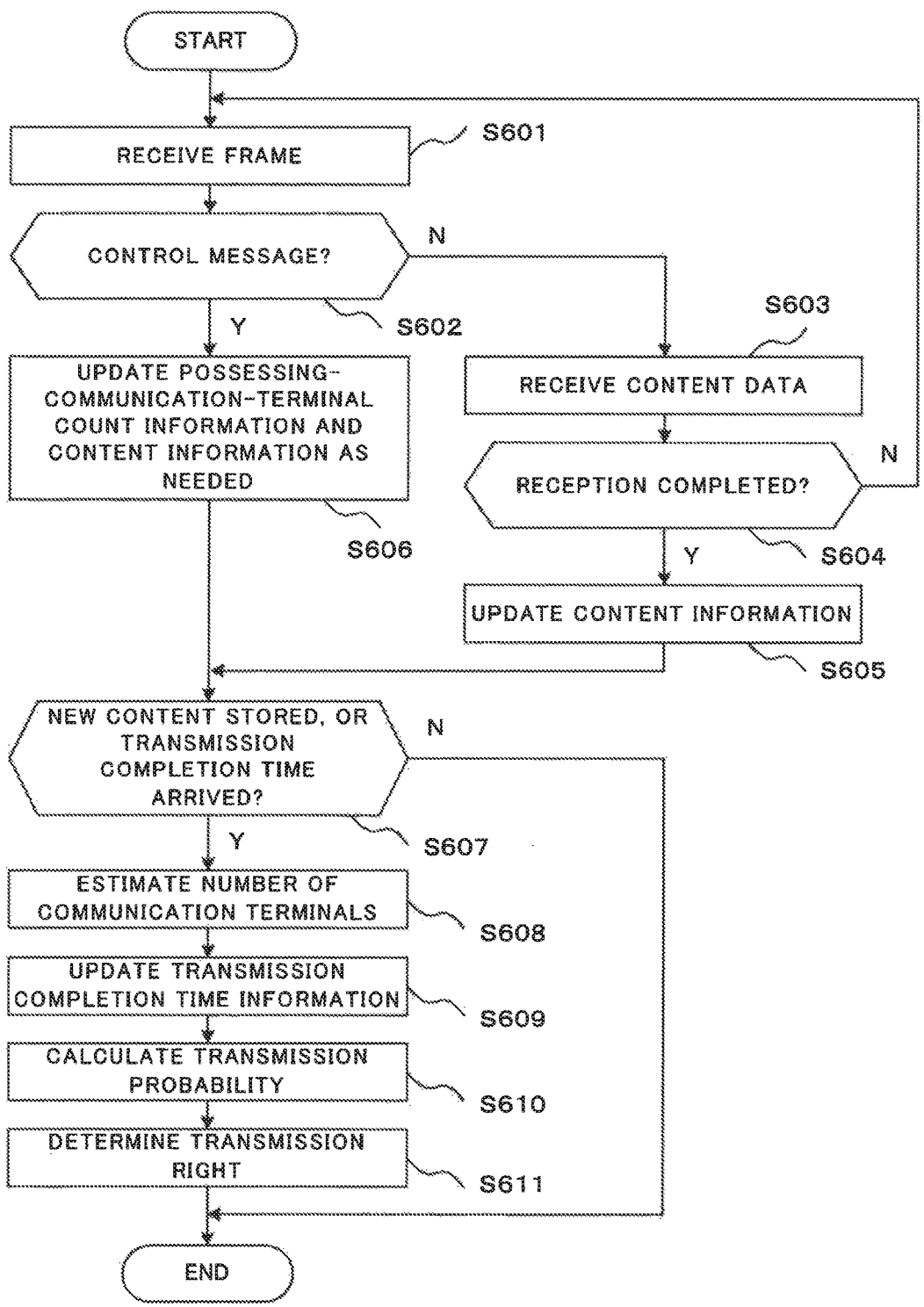
FIG. 17 is a flowchart illustrating an operation of the communication terminal according to the third exemplary embodiment of the present invention when the terminal receives a control message or content and determines a timing to transmit data.

Next, an operation of the communication terminal 300 according to the third exemplary embodiment of the present invention will be described. FIG. 17 is a flowchart illustrating an operation of the communication terminal 300 according to the third exemplary embodiment of the present invention when the terminal receives a control message or content and determines a timing to transmit data.

In the example illustrated in FIG. 17, processing in Steps S601 to S606, S608, S610, and S611 is similar to the processing in Steps S501 to S506 and S508 to S510 according to the second exemplary embodiment illustrated in FIG. 13, respectively, and therefore description thereof is omitted.

The content management unit 121 updates content information 332 as needed in processing in Steps S605 and S606. Then, when detecting by a received control message that new content is stored in an adjacent communication terminal 300 or the like or a transmission completion time of the new content arrives (Y in Step S607), the content management unit 121 proceeds to processing in Step S608. Otherwise (N in Step S607), the content management unit 121 ends the processing.

Note that determination of whether or not new content is stored in an adjacent communication terminal 300 or the like is similar to the processing according to the second exemplary embodiment, and therefore description thereof is omitted.

When new content is determined to be stored in any one of adjacent communication terminals 300 or the like in the processing in Step S607 (Y in Step S607), the transmitted-terminal count estimation unit 322 performs similar processing to the processing in Step S508 by the transmitted-terminal count estimation unit 222 according to the second exemplary embodiment to estimate a number of communication terminals with respect to the new content, and sets the estimated value to the estimated number of communication terminals in the content information 332 (Step S608).

Then, the transmitted-terminal count estimation unit 322 estimates a required transmission time required for the adjacent communication terminal 300 or the like first storing the new content to transmit the content to all the other adjacent communication terminals 300 or the like.

Estimation of the required transmission time is specifically performed by the following method. For example, information indicating a size of the content is added to a content list in a control message, and the storage means (unillustrated) is caused to store a previously received required transmission time of the content. Then, a data transmission rate is estimated in accordance with the required transmission time stored in the storage means and the information indicating the size of the content in the content list. The quotient obtained by dividing the size of the content by the estimated transmission rate may be estimated as a transmission time required for a communication terminal to transmit the content to another communication terminal. Furthermore, by multiplying the estimated transmission time by the sum of the value of j used in estimation of the number of communication terminals in Step S608 and a preset constant H, a required transmission time for transmitting the content to all the communication terminals can be estimated. A known technology is used for estimation of such a data transmission rate, and therefore detailed description thereof is omitted.

Furthermore, the reason for estimating the product of the estimated transmission time and the sum of j and H to be a required transmission time will be described. In this example, a content possessing communication terminal (regardless of whether or not being a same communication terminal) needs to perform j+1 sets of transmission in order to synchronize stored contents of other communication terminals. However, in practice, overhead is further required, and therefore a time corresponding to j+1 sets of transmission or more is considered necessary. Accordingly, by setting the difference as H, an estimated required transmission time can be brought closer to the actual required transmission time.

The content management unit 121 sets a time obtained by adding the required transmission time estimated by such a method to the current time as the transmission completion time information in the content information 332 of the new content (Step S609).

Further, when a piece of content reaches a transmission completion time or passes the transmission completion time (in other words, when the transmission completion time arrives) (Y in Step S607), the content management unit 121 performs the following processing. That is to say, on the basis of a time indicated by the transmission completion time information in the content information 332 of the content, the content management unit 121 searches for another piece of content subsequently reaching a transmission completion time. Then, in order to detect arrival of a time indicated by the transmission completion time information in the content information 332 of the another piece of content, the content management unit 121 causes the storage unit 330 to store a transmission completion time information indicating the time (Step S609). Then, the content management unit 121 proceeds to processing in Step S610.

Figure 18:
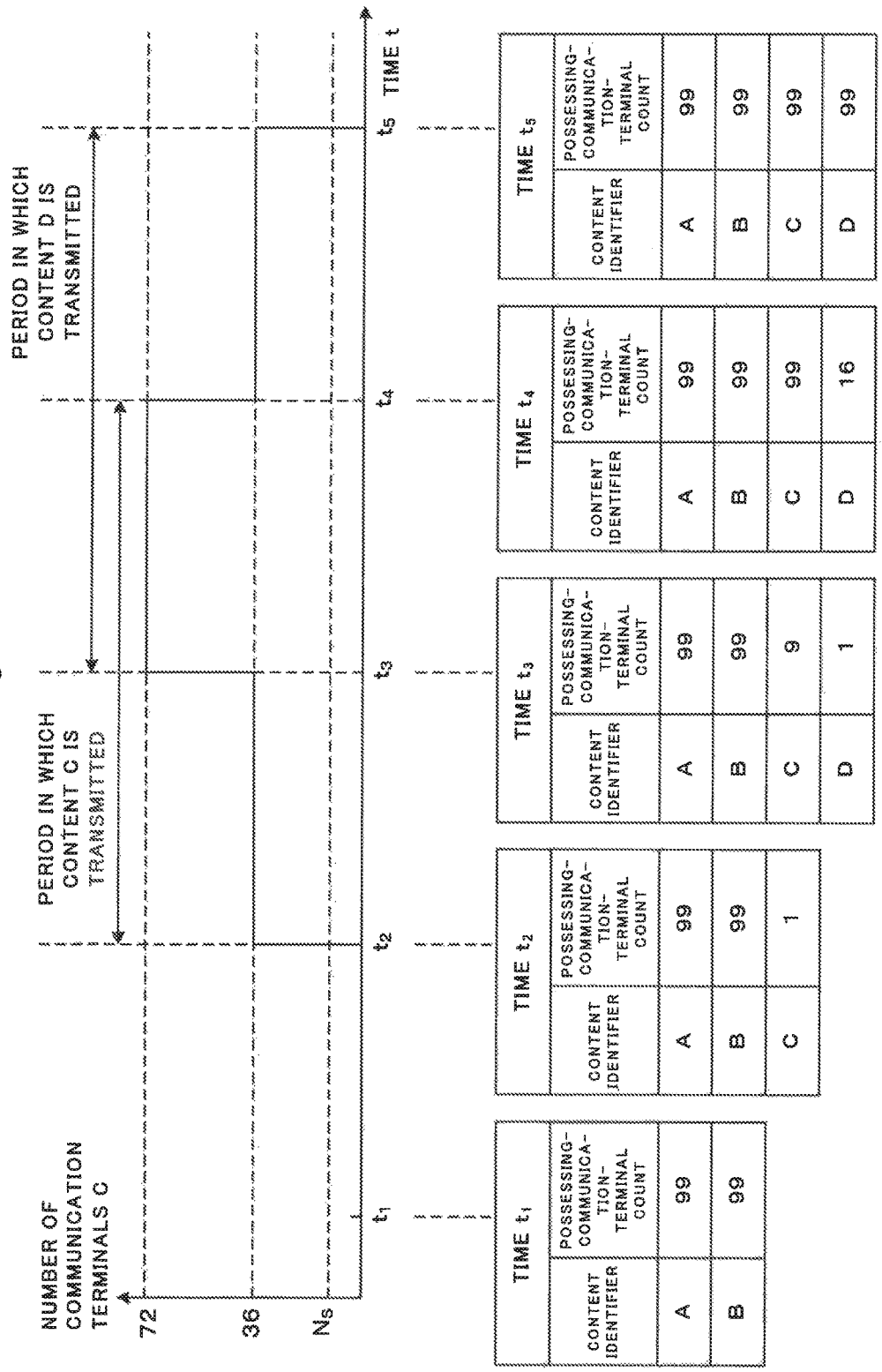
FIG. 18 is an explanatory diagram illustrating transition of a number of communication terminals according to the third exemplary embodiment.

FIG. 18 is an explanatory diagram illustrating transition of a calculated number of communication terminals according to the present exemplary embodiment.

Note that it is assumed that there are four piece of content: content A with a content identifier A, content B with a content identifier B, content C with a content identifier C, and content D with a content identifier D. It is further assumed that there are 100 communication terminals 300 in total: the own terminal 300 and 99 adjacent communication terminals 300. Furthermore, it is assumed that a number of communication terminals k to which content can be transmitted simultaneously is set to k=4 for each communication terminal 300. It is further assumed that a number of communication terminals $N_s$ that can transmit data at a same timing is set to $N_s$=10.

It is assumed that, at a time $t_1$ indicated in FIG. 18, the storage unit 330 in the own terminal 300 stores content information 332 as described below. That is to say, the content information 332 includes content information about the content A with the content identifier A and content information about the content B with the content identifier B. Further, the possession flag in either piece of the content information about the content A and the content B is set to 1. In other words, the storage unit 330 in the own terminal 300 stores both the content A and the content B. Further, the value of the possessing-communication-terminal count information in either piece of the content information about the content A and the content B is 99. In other words, each of the 99 adjacent communication terminals 300 stores the content A and the content B, and each of the 100 communication terminals 300 including the own terminal 300 stores the content A and the content B.

Accordingly, since both pieces of the content A and the content B are stored in all the communication terminals 300 and the value of the estimated-communication-terminal count information in the respective pieces of content information 332 corresponding to the content A and content B is 0 at the time $t_1$, the value of $C_A$ and the value of $C_B$ are both 0. Therefore, a number of communication terminals $C=C_A+C_B=0$ is obtained.

It is assumed that, at a time $t_2$, it is detected that one communication terminal 300 stores the content C with the content identifier C. Then, from equation (4), a number of communication terminals with respect to the content C $C_C=\min(4^3,100-4^3)=\min(64,36)=36$ is obtained. Therefore, $C=C_A+C_B+C_C=36$ is obtained. Note that, in this example, substitution of j=2 into equation (4) yields $4^2<100-4^2$, and substitution of j=3 yields $4^3>100-4^3$. Therefore, j=3 is employed. Further, the transmitted-terminal count estimation unit 322 estimates a completion time of data transmission of the content C and causes the storage unit 330 to store transmission completion time information indicating the estimation result as part of the content information 332. Further, transmitted-terminal count estimation unit 322 causes the storage unit 330 to store the estimation result as transmission completion time information indicating the earliest arriving transmission completion time.

It is assumed that, at a time $t_3$, one communication terminal 300 stores the content D with the content identifier D. Then, from equation (4), a number of communication terminals with respect to the content D $C_D=\min(4^3,100-4^3)=\min(64,36)=36$ is obtained. Therefore, $C=C_A+C_B+C_C+C_D=72$ is obtained. Note that, in this example, j=3 is employed as described above. Further, the transmitted-terminal count estimation unit 322 estimates a completion time of data transmission of the content D and causes the storage unit 330 to store transmission completion time information indicating the estimation result as part of the content information 332. It is assumed in this example that the completion time of data transmission of the content D is later than the completion time of data transmission of the content C. In this case, the transmission completion time information stored in the storage unit 330 as the earliest arriving transmission completion time remains to be the transmission completion time information of the content C.

Then, when a time indicated by the transmission completion time information about the content C arrives at a time $t_4$, the value of the estimated-communication-terminal count information in the content information 332 about the content C is set from a previous value of 36 to 0. Therefore, $C_C=0$ is obtained, and therefore $C=C_A+C_B+C_C+C_D=36$ is obtained. Then, the transmission completion time information stored in the storage unit 330 as the earliest arriving transmission completion time is updated from the transmission completion time information of the content C to the transmission completion time information of the content D.

Furthermore, at a time $t_5$, the value of the estimated-communication-terminal count information in the content information 332 about the content D is set from a previous value of 36 to 0. Therefore, $C_D=0$ is obtained, and therefore $C=C_A+C_B+C_C+C_D=0$ is obtained.

In addition to the effect according to the first exemplary embodiment and the effect according to the second exemplary embodiment, even when, for example, a control message for detecting that each piece of content is possessed by all communication terminals 300 is lost, the present exemplary embodiment is able to estimate a time when each piece of content is possessed by all the communication terminals 300, and is able to more exactly estimate a number of communication terminals C.

Figure 19:
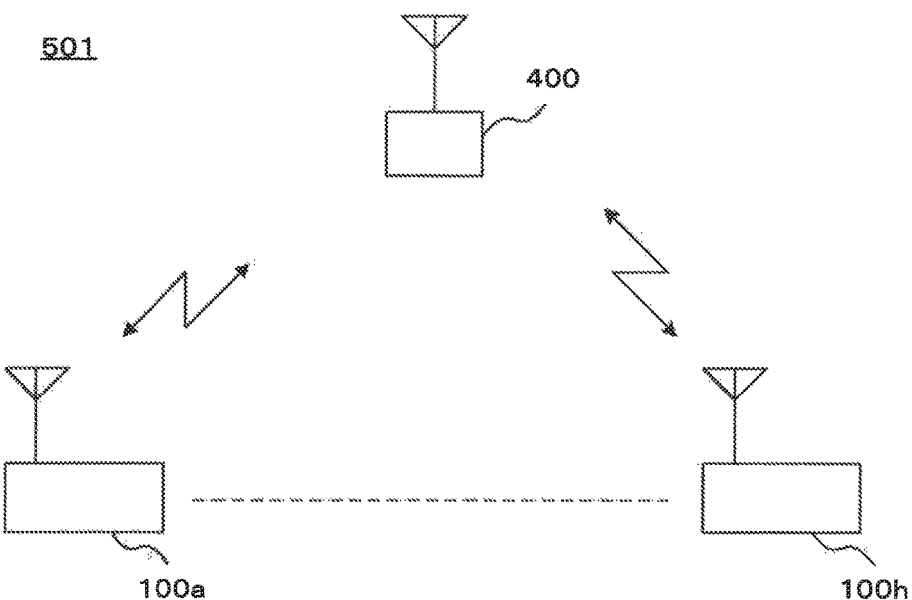
FIG. 19 is a block diagram illustrating an example of a wireless communication system in which each communication terminal is configured to communicate through an access point.

Each of the communication terminals 100, 200, and 300 according to the aforementioned respective exemplary embodiments communicates with one another in an ad hoc mode. However, each of the communication terminals 100, 200, and 300 may be configured to communicate with one another through a wireless LAN access point. FIG. 19 is a block diagram illustrating an example of a wireless communication system 501 so configured that each communication terminal communicates through an access point 400. In the example illustrated in FIG. 19, communication terminals 100a to 100h communicate with one another through the access point 400 as examples of the communication terminals 100, 200, and 300.

In such a configuration, even when each of the communication terminals 100, 200, and 300 is not able to directly communicate with one another, mutual communication can be performed through the wireless LAN access point 400, and the effects according to the first to third exemplary embodiments can be provided.

Furthermore, each component of the communication terminals 100, 200, and 300 according to the aforementioned respective exemplary embodiments may be provided by use of a semiconductor processing part including an application specific integrated circuit (ASIC). Further, the components may be provided by causing a computer system including at least one processor (e.g. a microprocessor [micro processing unit: MPU] and a digital signal processor [DSP]) to execute a program. Specifically, one or more programs including an instruction group for causing a computer system to execute an algorithm related to the transmission signal processing or the received signal processing performed by the information delivery control unit 120, the transmission right adjustment unit 140, the data accumulation unit 150, and the storage unit 130, according to the first exemplary embodiment, the information delivery control unit 220, the transmission right adjustment unit 140, the data accumulation unit 150, and the storage unit 230, according to the second exemplary embodiment, and the information delivery control unit 320, the transmission right adjustment unit 140, the data accumulation unit 150, and the storage unit 330, according to the third exemplary embodiment, may be created, and the one or more programs may be executed by the computer.

The one or more programs may be stored in various types of non-transitory computer readable media and provided for the computer. The non-transitory computer readable medium includes various types of tangible storage media. The non-transitory computer readable medium includes, for example, a magnetic storage medium (e.g. a flexible disk, a magnetic tape, and a hard disk), a magneto-optical storage medium (e.g. a magneto-optical disk), a compact disc read only memory (CD-ROM), a compact disc-recordable (CD-R), a compact disc-rewritable (CD-R/W), and a semiconductor memory (e.g. a mask ROM, a programmable ROM [PROM], an erasable PROM [EPROM], a flash ROM, and a random access memory [RAM]). Further, the one or more programs may be provided for the computer by various types of transitory computer readable media. An example of the transitory computer readable medium includes an electrical signal, an optical signal, and an electromagnetic wave. The transitory computer readable medium is able to provide the one or more programs for the computer through a wired channel such as an electric wire and an optical fiber, or a wireless channel.

Furthermore, the aforementioned respective exemplary embodiments are not limited to the above and may be modified as appropriate within the spirit thereof.

For example, the transmission probability calculation unit 141 according to the aforementioned respective exemplary embodiments calculates a transmission probability p being an adjustment reference value by the calculation method expressed in equation (3), by use of a number of communication terminals C and a preset number of communication terminals $N_s$ that can transmit data at a same timing.

However, a number of communication terminals obtaining a transmission right, according to the aforementioned respective exemplary embodiments, can be approximated by a success count calculated in accordance with a binomial distribution B(C, p) based on an independent trial count C (corresponding to a number of communication terminals C) and a success probability p in each trial (corresponding to a probability p of obtaining a transmission right in a time slot).

Accordingly, a method of setting a probability a of a number of communication terminals that can transmit data at a same timing being $N_s$, and obtaining and using a probability p of a number of communication terminals transmitting data at a same timing being less than or equal to $N_s$ with the probability a as a transmission probability may also be considered. In this case, a probability of a random variable X being X=k (k=0, 1, . . . , C) is given by equation (5).

$$P[X = k] = \binom{C}{k} p^k (1-p)^{C-k} \qquad (5)$$
$$= \frac{C!}{k!(C-k)!} p^k (1-p)^{C-k}$$

Accordingly, it is considered that, by obtaining and using a probability p satisfying equation (6) below, more effective control can be provided. Note that, it is preferable that the transmission probability p be a maximum value of the probabilities p satisfying equation (6).

$$\sum_{i=0}^{N_s} P[X = i] = \sum_{i=0}^{N_s} \frac{C!}{i!(C-i)!} p^i (1-p)^{C-i} \leq \alpha \qquad (6)$$

Further, the number of communication terminals obtaining a transmission right, according to the respective exemplary embodiments, may also be approximated by use of a Poisson distribution or a normal distribution.

The transmitted-terminal count estimation unit 122 according to the aforementioned first exemplary embodiment estimates a number of communication terminals C every time content information 132 is updated in the processing in Steps S107 and S108 and inputs the estimation result to the transmission probability calculation unit 141. However, the transmitted-terminal count estimation unit 122 may be configured to perform the processing in Step S108 at intervals of a preset transmitted-terminal count update time to estimate a number of communication terminals, and input the estimation result to the transmission probability calculation unit 141.

In this case, the transmission probability calculation unit 141 starts the transmission probability calculation processing in Step S109, triggered by notification of the number of communication terminals by the transmitted-terminal count estimation unit 122. However, when the number of communication terminals C and a number of adjacent communication terminals 100 are not changed from those in a previous notification, the transmission probability calculation unit 141 may be configured not to perform transmission probability calculation processing based on the current notification and utilize a previously calculated transmission probability.

Similarly, in the processing in Step S508 according to the second exemplary embodiment and the processing in S608 according to the third exemplary embodiment, the transmitted-terminal count estimation unit may be configured to notify the transmission probability calculation unit 141 of the result of estimation of the number of communication terminals C at intervals of a preset transmitted-terminal count update time.

Furthermore, the transmission probability calculation unit 141 may be configured to utilize a previously calculated transmission probability when the number of communication terminals C and the number of adjacent communication terminals 100 are not changed from those in a previous notification in the processing in Steps S509 or S610 corresponding to the estimation result.

The data block transmission unit 153 according to the aforementioned respective exemplary embodiments performs processing of inputting data to the communication unit 160 in response to notification by the transmission right determination unit 142 in the processing in Step S302. However, the data block transmission unit 153 may be configured to inquire of the transmission right determination unit 142 whether or not transmission is permitted for each data block when a data block to be transmitted is stored in the data block storage unit 152. Then, the data block transmission unit 153 may be configured to input a data block to the communication unit 160 in response to notification of transmission permission by the transmission right determination unit 142.

Note that, when transmission is not permitted, the transmission right determination unit 142 may notify the data block transmission unit 153 of a next inquiry time together with non-permission of transmission. The next inquiry time is, for example, a time corresponding to the ending time of the time slot to which transmission non-permission is notified at the time. That is to say, the next inquiry time is, for example, a time corresponding to the starting time of the next time slot in which whether a transmission right is generated or not is determined. Further, for example, when the transmission right determination unit 142 is configured to simultaneously determine transmission rights to M time slots, the next inquiry time is a time corresponding to the ending time of the M-th time slot.

Note that, various methods and timings may be considered in terms of notification of whether or not transmission to the data block transmission unit 153 is permitted by the transmission right determination unit 142. As long as it is possible that the transmission right determination unit 142 determines whether or not transmission is permitted for each time slot, in accordance with a transmission probability calculated by the transmission probability calculation unit 141, and the data block transmission unit 153 transmits data in accordance with the determined transmission permission, the method may be changed as appropriate.

Further, data input from the information delivery control unit to the communication unit 160, according to the aforementioned respective exemplary embodiments, are all transmission controlled by the data accumulation unit 150 in accordance with a transmission probability.

However, transmission priority may be set depending on a type and a size of data, content, and the like. Further, the information delivery control unit may be configured to input data set with high-level priority directly to the communication unit 160 to cause the data to be transmitted without transmission control in accordance with a transmission probability by the data accumulation unit 150. Note that, data blocks may be directly input to the communication unit 160 after the data division unit 151 in the data accumulation unit 150 divides data into the data blocks. Such a configuration is able to provide priority-based transmission control.

The aforementioned respective exemplary embodiments are merely examples related to application of the technological concept obtained by the present inventors. In other words, the technological concept is not limited solely to the aforementioned exemplary embodiments, and it goes without saying that various modifications can be made thereto.

Fourth Exemplary Embodiment

Figure 20:
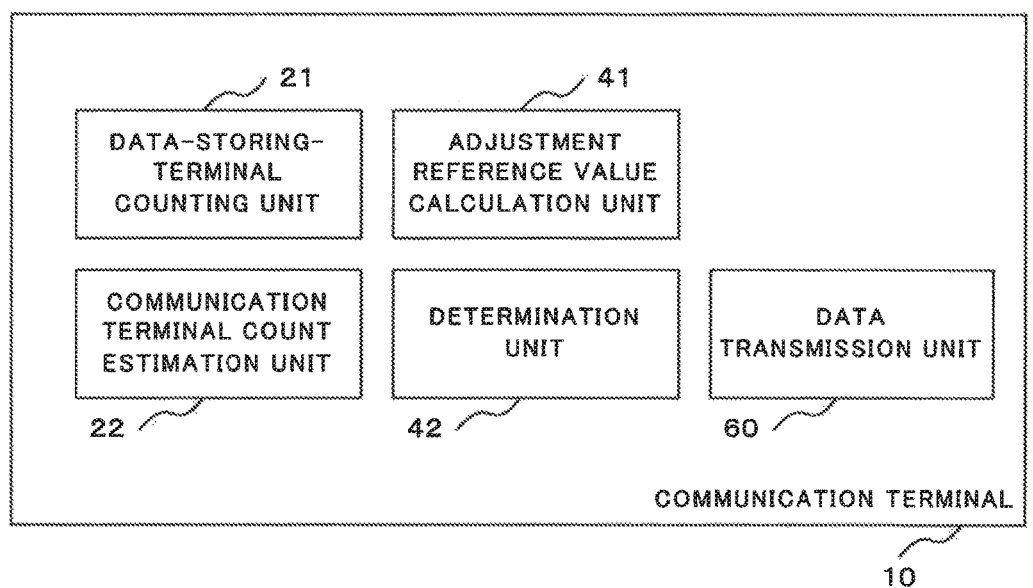
FIG. 20 is a block diagram illustrating a configuration example of a communication terminal according to a fourth exemplary embodiment of the present invention.
Figure 21:
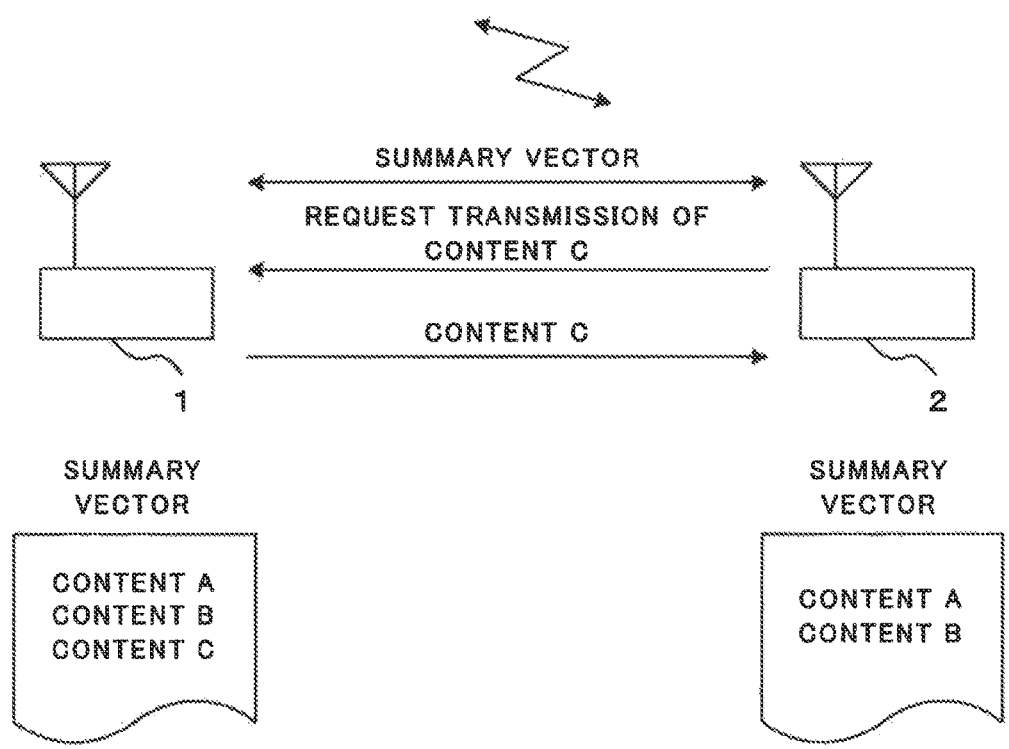
FIG. 21 is an explanatory diagram illustrating an example of a communication system synchronizing stored contents by an epidemic method.

Next, a communication terminal 10 according to a fourth exemplary embodiment of the present invention will be described with reference to a drawing. FIG. 20 is a block diagram illustrating a configuration example of the communication terminal 10 according to the fourth exemplary embodiment of the present invention. As illustrated in FIG. 20, the communication terminal 10 according to the fourth exemplary embodiment of the present invention includes a data-storing-terminal counting unit 21, a communication terminal count estimation unit 22, an adjustment reference value calculation unit 41, a determination unit 42, and a data transmission unit 60.

Note that the data-storing-terminal counting unit 21 corresponds to the content management unit 121 illustrated in FIGS. 2, 11, and 15. The transmitted-terminal count estimation unit 22 corresponds to the transmitted-terminal count estimation units 122, 222, and 322 respectively illustrated in FIGS. 2, 11, and 15. The adjustment reference value calculation unit 41 corresponds to the transmission probability calculation unit 141 illustrated in FIG. 5. The determination unit 42 corresponds to the transmission right determination unit 142 illustrated in FIG. 5. The data transmission unit 60 corresponds to the data accumulation unit 150 illustrated in FIGS. 2, 11, and 15.

In accordance with each piece of data information indicating data transmitted from each another communication terminal and stored in the another communication terminal, and stored contents in a storage means in the own terminal, the data-storing-terminal counting unit 21 counts, for each piece of data, a number of one or more communication terminals storing the data.

In accordance with the counting result of the data-storing-terminal counting unit 21, the communication terminal count estimation unit 22 estimates a number of zero or more communication terminals mutually transmitting data at a same timing.

The adjustment reference value calculation unit 41 calculates an adjustment reference value for limiting the number of zero or more communication terminals estimated by the communication terminal count estimation unit 22 to a preset permissible number or less.

In accordance with the adjustment reference value calculated by the adjustment reference value calculation unit 41, the determination unit 42 determines whether or not to permit transmission of data stored in the storage means.

When the determination unit 42 permits transmission of the data, the data transmission unit 60 transmits the data to a communication terminal not storing the data.

The present exemplary embodiment is able to satisfactorily suppress increase in a data collision count even when a number of communication terminals connected to a communication network increases.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-135816, filed on Jul. 1, 2014, the disclosure of which is incorporated herein in its entirety by reference.

REFERENCE SIGNS LIST

10, 100, 200, 300 Communication terminal
21 Data-storing-terminal counting unit
22 Communication terminal count estimation unit
41 Adjustment reference value calculation unit
42 Determination unit
60 Data transmission unit
120, 220, 320 Information delivery control unit
121 Content management unit
122, 222, 322 Transmitted-terminal count estimation unit
123 Control message transmission-reception unit
130, 230, 330 Storage unit
131 Communication terminal information
132, 232, 332 Content information
140 Transmission right adjustment unit
141 Transmission probability calculation unit
142 Transmission right determination unit
150 Data accumulation unit
151 Data division unit
152 Data block storage unit
153 Data block transmission unit
160 Communication unit
400 Access point

What is claimed is:

1. A communication method comprising:

counting a number of one or more communication terminals which stores data, for each piece of data, in accordance with each piece of data information, transmitted from each another communication terminal, indicating the each piece of data stored in the another communication terminal, and stored contents in a storage unit in the own terminal;

estimating a number of zero or more communication terminals mutually transmitting data at a same timing in accordance with the counting result;

calculating an adjustment reference value for limiting the estimated number of zero or more communication terminals to a preset permissible number or less;

determining whether or not to permit transmission of data stored in the storage unit in accordance with the calculated adjustment reference value; and transmitting the data to a communication terminal not storing the data, when permitting transmission of the data.

* * * * *